United States Patent
Wada

(10) Patent No.: US 8,077,353 B2
(45) Date of Patent: Dec. 13, 2011

(54) COLOR CONVERSION METHOD, COLOR CONVERSION TABLE CREATED BY THE COLOR CONVERSION METHOD, IMAGE PROCESSING APPARATUS, AND COLOR CONVERSION PROGRAM

(75) Inventor: Takeshi Wada, Kagoshima (JP)

(73) Assignee: Seiko Epson Corporation, Tokyo (JP)

(*) Notice: Subject to any disclaimer, the term of this patent is extended or adjusted under 35 U.S.C. 154(b) by 441 days.

(21) Appl. No.: 12/469,547

(22) Filed: May 20, 2009

(65) Prior Publication Data

US 2009/0310157 A1 Dec. 17, 2009

(30) Foreign Application Priority Data

Jun. 17, 2008 (JP) ................................. 2008-158423

(51) Int. Cl.
*H04N 1/60* (2006.01)
*G03F 3/08* (2006.01)

(52) U.S. Cl. ......... 358/1.9; 358/518; 358/520; 358/529; 345/601; 382/162; 382/167

(58) Field of Classification Search .................. 358/1.9, 358/504, 518, 515, 520, 521, 448, 529; 345/601; 382/162, 167; 399/27, 49
See application file for complete search history.

(56) References Cited

U.S. PATENT DOCUMENTS

| | | | | |
|---|---|---|---|---|
| 7,307,753 B2* | 12/2007 | Sasaki et al. | .................... | 358/1.9 |
| 7,777,926 B2* | 8/2010 | Une | .............................. | 358/521 |
| 7,982,908 B2* | 7/2011 | Kita et al. | ....................... | 358/1.9 |
| 2005/0248789 A1* | 11/2005 | Kita et al. | ....................... | 358/1.9 |
| 2006/0140650 A1* | 6/2006 | Yokote | ............................. | 399/27 |
| 2007/0058225 A1* | 3/2007 | Une | ............................... | 358/521 |
| 2008/0137112 A1* | 6/2008 | Tin | ................................. | 358/1.9 |
| 2009/0073474 A1* | 3/2009 | Saito et al. | ....................... | 358/1.9 |
| 2011/0194129 A1* | 8/2011 | Fujiwara | ......................... | 358/1.9 |

FOREIGN PATENT DOCUMENTS

| | | |
|---|---|---|
| JP | 2003-087590 | 3/2003 |
| JP | 2003-324623 | 11/2003 |
| JP | 2005-142992 | 6/2005 |
| JP | 4022748 | 12/2007 |

* cited by examiner

*Primary Examiner* — Kimberly A Williams
(74) *Attorney, Agent, or Firm* — DLA Piper LLP (US)

(57) ABSTRACT

There is provided a color conversion method. The method includes: a black correction step of converting the first black corresponding to the first color data having a tone value of 0 to the second black corresponding to the second color data having a tone value of 0 so that when the first black corresponding to the first color data having a tone value other than 0 is converted to a value smaller than a quantization threshold of tone values 0 and 1 of the second color data, a conversion destination becomes greater than or equal to the quantization threshold; a recording agent limit quantity calculating step of setting an upper limit of the sum of tone values for each pixel of the second color data with respect to a predetermined print medium; and a chromatic color correcting step of converting the second chromatic color so that the second color data after conversion in the black correction step does not exceed the upper limit.

11 Claims, 17 Drawing Sheets

FIG. 4

| C1 | M1 | Y1 | K1 | C2 | M2 | Y2 | K2 |
|---:|---:|---:|---:|---:|---:|---:|---:|
| 0 | 0 | 0 | 0 | c21 | m21 | y21 | k21 |
| 0 | 0 | 0 | 1 | c22 | m22 | y22 | k22 |
| 0 | 0 | 0 | 2 | c23 | m23 | y23 | k23 |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| 255 | 255 | 255 | 255 | c255 | m255 | y255 | k255 |

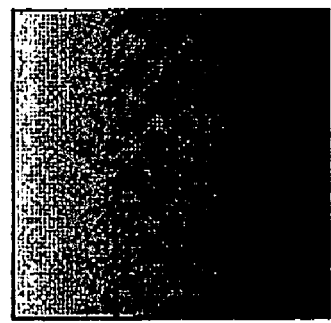
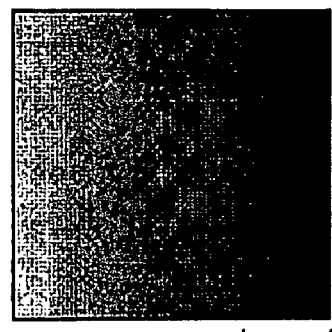
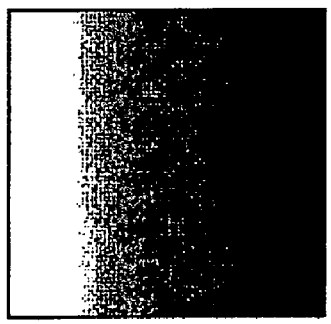
FIG. 12A GRADATION IS POOR
FIG. 12B BLACKOUT CONDITION OCCURS
FIG. 12C

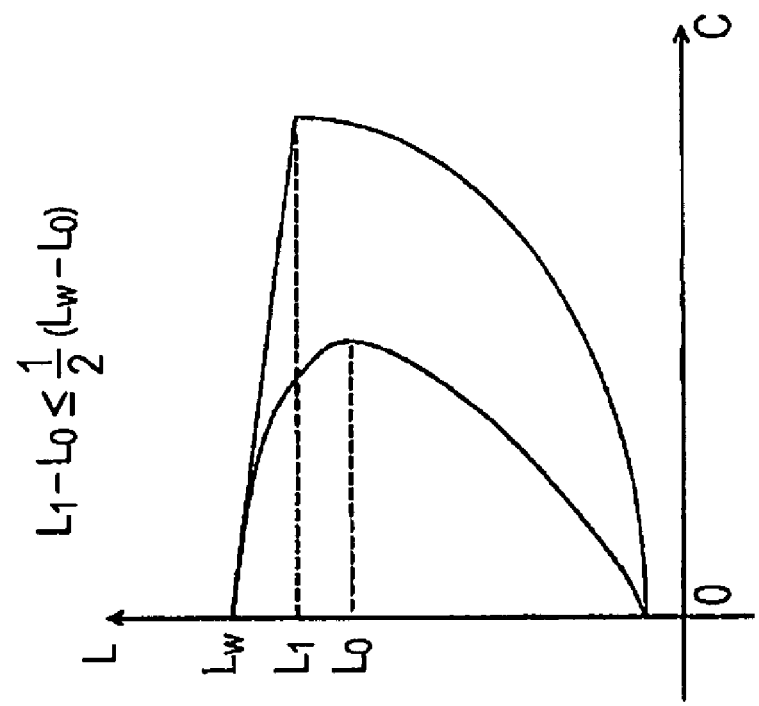
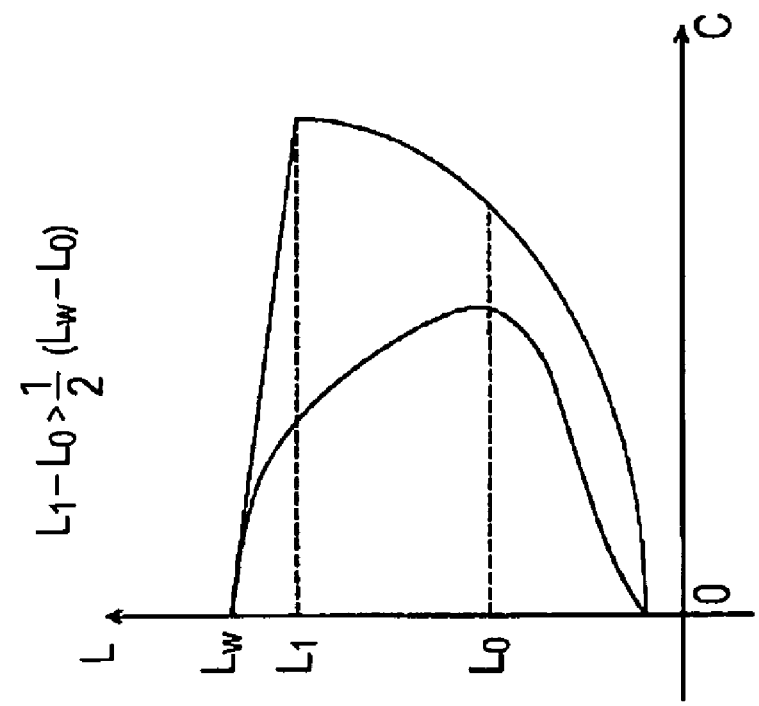
FIG. 19 ial Field
COLOR CONVERSION METHOD, COLOR CONVERSION TABLE CREATED BY THE COLOR CONVERSION METHOD, IMAGE PROCESSING APPARATUS, AND COLOR CONVERSION PROGRAM

BACKGROUND

1. Technical Field

The present invention relates to a color conversion method, a color conversion table created by the color conversion method, an image processing apparatus, and a color conversion program. More specifically, the invention relates to a color conversion method for converting first color data in a first color space to second color data in a second color space, based on a first profile that defines the correspondence between the first color space that is expressed by a first chromatic color and a first black and a predetermined device-independent color space, a second profile that defines the correspondence between the second color space that is expressed by a second chromatic color and a second black and the device-independent color space, and a color conversion rule in the device-independent color space, a color conversion table created by the color conversion method, an image processing apparatus, and a color conversion program.

2. Related Art

In the related art, when performing color matching between image data of one color space and image data of another color space, if the one color space is expressed by composite colors (for example, CMY components) and black (K) and another color space is expressed by composite colors (for example, CMY components) and black (K), there is reported a phenomenon that K=0 is converted to K≠0 or K≠0 is converted to K=0. Such a phenomenon is reportedly attributed to conversion of K to black expressed by equal CMY quantities or conversion of black expressed by equal CMY quantities to K or the user's tone curve adjustment.

In order to address such a phenomenon, a full-black method, clipping of K values, and the like have been proposed (for example, see JP-2003-324623). Moreover, calculation of K considering the color reproducibility has been proposed (for example, see JP-B-4022748).

The full-black method is a simple method of substituting a color expressed by equal CMY quantities (C=M=Y) with K. Although this method takes tinge into consideration to some extent, since the characteristics of each device are not taken into consideration, a change in tinge is noticed. Moreover, the blacks originally produced by the equal CMY quantities are all substituted with black, the granularity increases and thus a resulting image is printed with whiskers being observed on a face or the like.

When the K values are clipped (that is, an input of K=0 is output as K=0 and an input of K≠0 is output as K≠0), it is unable to take color matching into consideration, greatly changing the black quantity, and thus the tinge is greatly changed. Therefore, the full-black method or the clipping of K values is not appropriate.

In the calculation of K values considering the color reproducibility, a tone distortion or the like is not likely to occur since the K values at which mapping does not occur are calculated considering a gamut area. However, in a system allowing a user to control the color reproduction, since it is not allowed to place limitations on the gamut area, the clipping occurs if the K values to be processed are outside the gamut, and thus the tone distortion occurs.

SUMMARY

An advantage of some aspects of the invention is that it provides a color conversion method capable of ensuring the color reproducibility of black in input image data while reflecting the user's color adjustment, such as a tone curve adjustment, in a previous state, a color conversion table created by the color conversion method, an image processing apparatus having the color conversion table, and a color conversion program.

According to an aspect of the invention, there is provided a color conversion method for converting first color data in a first color space to second color data in a second color space, based on a first profile that defines the correspondence between the first color space that is expressed by a first chromatic color and a first black and a predetermined device-independent color space, a second profile that defines the correspondence between the second color space that is expressed by a second chromatic color and a second black and the device-independent color space, and a color conversion rule in the device-independent color space. The method is configured to include a black correction step, a recording agent limit quantity calculating step, and a chromatic color correcting step.

In the above configuration, in the black correction step, when the first black corresponding to the first color data having a tone value 0 is converted to the second black corresponding to the second color data having a tone value other than 0, the first black is corrected to the second black having a tone value of 0. In the black correction step, when the first black corresponding to the first color data having a tone value other than 0 is converted to a value smaller than a quantization threshold of tone values 0 and 1 of the second color data, correction is made so that a conversion destination becomes greater than or equal to the quantization threshold. In the recording agent limit quantity calculating step, an upper limit of the sum of tone values for each pixel of the second color data is set with respect to a predetermined print medium In the chromatic color correcting step, the tone value of the second chromatic color is converted so that the second color data after conversion in the black correction step does not exceed the upper limit.

In an alternative embodiment of the invention which is preferable when performing printing considering the upper limit of the recording agent quantity recordable on a predetermined print medium, the color conversion method has such a configuration that in the chromatic color correcting step, the second chromatic color of the conversion destination is calculated by an interpolation calculation on the basis of a combination that does not exceed the upper limit, among combinations of the second chromatic color and the second black defined in the second profile.

In an alternative embodiment of the invention which is preferable in order to perform color conversion without the cost of tinge before and after the color conversion, the color conversion method has such a configuration that in the chromatic color correcting step, the chromatic colors are converted to have nearest hue values before and after the color conversion.

In an alternative embodiment of the invention which is particularly preferable when calculating the chromatic colors having the nearest hue values before and after the color conversion while considering the recording agent limit quantity, the color conversion method has such a configuration that it further includes a color gamut conversion step of forming a second chromatic color gamut that represents a color reproducible range producible by the second chromatic color without changing a quantity of black on the basis of the upper limit so that a grid point located outside the second chromatic color gamut is converted to a color point located inside the second chromatic color gamut.

In an alternative embodiment of the invention which makes it possible to perform good color reproduction while maintaining the tone properties during mapping of the color gamuts, the color conversion method has such a configuration that when for a predetermined hue in the predetermined device-independent color space, there is an out-of-gamut region which is out of a color gamut of a second chromatic color gamut that represents a color reproducible range expressible by the second chromatic color without changing a quantity of the second black within the range of the upper limit ink quantity and which is in a color gamut of a second color space formed by the first profile and the color conversion rule, the method further includes: a detecting step of detecting a lightness at a maximum chroma of the color gamut of the second chromatic color gamut in the predetermined hue; a color gamut conversion step of compressing a color gamut shape of the second color space based on a color gamut shape of the second chromatic color gamut by performing a color gamut conversion process of mapping to be in the color gamut of the second chromatic color gamut while compressing both chromas and lightnesses on a high-lightness side of the lightness detected in the detecting step, while performing a color gamut conversion process of mapping to be in the color gamut of the second chromatic color gamut while maintaining approximately constant lightnesses on a low-lightness side of the lightness detected in the detecting step and compressing chromas, thereby defining the correspondence between the color gamut of the second color space and the color gamut of the second chromatic color gamut; and a color conversion step of converting the first color data to the second color data on the basis of the correspondence.

Here, as the device-independent color space, various color spaces can be employed, and various absolute color spaces such as Lab, Jab, or XYZ can be employed. Although the above-mentioned process is performed within a predetermined hue range and does not actively change the hue values, it does not inhibit the hue values of the second color data and the first color data from becoming different due to the behavior of the processing device-independent color space, the space conversion, and the image device errors. Even if the hue values are not actively changed, the hue values are changed by an amount of about 0 to 10 degrees over the range on which the color gamut conversion process is performed. However, the color gamut conversion process according to the invention can be performed not only to a single out-of-gamut region but also to a plurality of out-of-gamut regions. According to this configuration, since both the chroma and lightness values on the high-lightness side of the lightness detected in the detecting step are compressed during the color gamut conversion, the color representation becomes rich. Moreover, since the compression is performed while maintaining the lightness on the low-lightness side of the lightness detected in the detecting step, the tone properties are improved.

In an alternative embodiment of the invention which takes the shape of the outer shell of color gamut cut at a predetermined hue angle into consideration, in which the chroma generally decreases gradually as the lightness becomes distant from the lightness detected in the detecting step, the color conversion method has such a configuration that in the color gamut conversion step, on the high-lightness side of the lightness detected in the detecting step, when a color gamut shape of the second color space is fitted to a color gamut shape of the second chromatic color gamut, a color gamut conversion process of mapping to be in the color gamut of the second color space is performed by gradually decreasing a compression ratio of lightnesses as a lightness to be compressed gets closer to the lightness detected in the detecting step. According to this configuration, since the compression ratio of the lightness increases as the lightness increases from the lightness detected in the detecting step, the color gamut conversion process capable of providing good color reproduction on the high-lightness range and maintaining the tone properties on the low-lightness region can be achieved.

In an alternative embodiment of the invention which considers an aspect that different color gamut conversion processes are performed on the high-lightness and low-lightness sides on the basis of the lightness detected in the detecting step, the color conversion method has such a configuration that in the color gamut conversion step, when a color gamut shape of the second color space is fitted to a color gamut shape of the second chromatic color gamut, a color gamut conversion process is performed while performing the compression so that at the lightness detected in the detecting step, a compression ratio and a compression direction on the high-lightness side of the lightness detected in the detecting step coincide with a compression ratio and a compression direction on the low-lightness side of the lightness detected in the detecting step. According to this configuration, since the compression ratio and the compression direction are continuous before and after the lightness detected in the detecting step, smooth color conversion can be achieved in the vicinity of the lightness detected in the detecting step. Moreover, it is possible to prevent the occurrence of the lightness inversion phenomenon at the lightness detected in the detecting step.

In an alternative embodiment of the invention regarding the compression direction on the high-lightness side of the lightness detected in the detecting step, the color conversion method has such a configuration that in the color gamut conversion step, when the color gamut shape of the second color space is fitted to the color gamut shape of the second chromatic color gamut on the high-lightness side of the lightness detected in the detecting step, a color gamut conversion process of compressing the color gamut shape toward the lightness detected in the detecting step on a lightness axis of the device-independent color space while mapping into the color gamut of the second color space with a compression ratio corresponding to a distance from an outer shell of the color gamut of the second chromatic color gamut is performed. According to this configuration, the color gamut conversion process can be performed so that as the lightness increases from the lightness detected in the detecting step, the compression ratio of the lightness gradually increases and the compression ratio of the chroma gradually decreases.

In an alternative embodiment of the invention regarding the compression destination of the out-of-gamut region, the color conversion method has such a configuration that in the color gamut conversion step, when the color gamut shape of the second color space is fitted to the color gamut shape of the second chromatic color gamut on the high-lightness side of the lightness detected in the detecting step, a color gamut conversion process of limiting a compression destination of the out-of-gamut region to a predetermined range from the outer shell of the second chromatic color gamut and normalizing the out-of-gamut region and the predetermined range in the compression direction with respect to the predetermined range is performed.

The above-described color conversion method may be embodied in various forms, such as a form in which the method is implemented as part of another method, a form in which the method is implemented as an image processing apparatus having units corresponding to the respective steps or an image processing apparatus having a color conversion table created by the color conversion method. Moreover, the invention may be embodied as an image processing system having the image processing apparatus, a program for causing a computer to implement functions corresponding to the configurations of the above-described method, or a computer-readable recording medium recording the program. These image processing system, image processing apparatus, color conversion program, medium recording the program can also provide the same operations and effects as those of the invention. The configurations described in the alternative embodiments are also applicable to the system, the apparatus, the program, or the recording medium.

BRIEF DESCRIPTION OF THE DRAWINGS

The invention will be described with reference to the accompanying drawings, wherein like numbers reference like elements.

FIG. 4 is an explanatory diagram showing an example of an LUT 15*b*.

FIGS. 12A to 12C are diagrams for explaining an operational effect of using different compression algorithms before and after a cusp value.

FIG. 19 is a diagram for explaining a method for switching compression algorithms in a gamut mapping process according to a modification.

DESCRIPTION OF EXEMPLARY EMBODIMENTS

Figure 1:
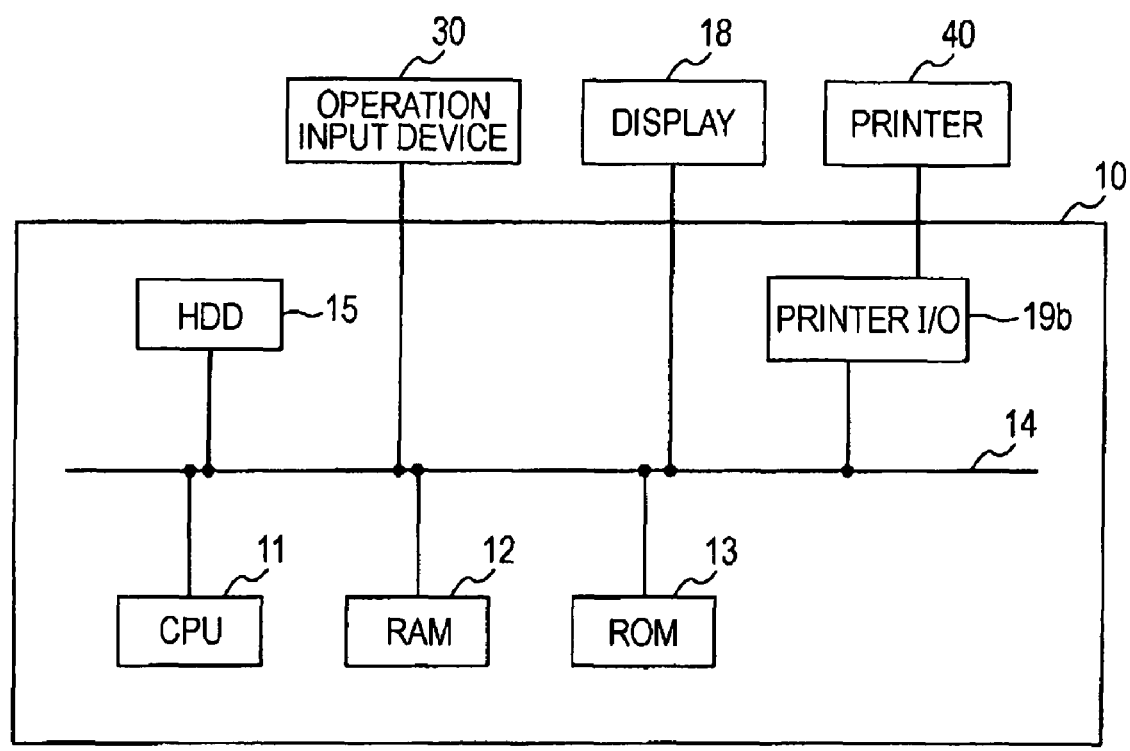
FIG. 1 is a block diagram showing a simplified hardware structure of a computer that executes a color conversion program according to an embodiment of the invention.

Hereinafter, exemplary embodiments of the invention will be described in the following order:
(1) Structure of image processing apparatus;
(2) Print operation;
(3) LUT creation process;
(3-1) Black correction process;
(3-2) Recording agent limit quantity correction process;
(3-3) Gamut mapping process;
(3-4) Interpolation process;
(4) Modification of Gamut mapping process; and
(5) Summary
(1) Structure of Image Processing Apparatus FIG. 1 shows the simplified hardware structure of a computer that executes a color conversion program provided in accordance with the invention. In the drawing, a computer 10 includes a CPU 11 which is the center of arithmetic processing, and the CPU 11 is able to make access to a RAM 12 and a ROM 13 via a system bus 14. The RAM 12 is used as a work area for arithmetic processing, and the ROM 13 has recorded therein low-level programs (for example, BIOS, etc.) that provide functions allowing an OS or applications to make access to devices of the computer. To the system bus 14, a hard disk drive (HDD) 15 as a nonvolatile storage device is connected. An OS 20, an application program (APL) 25, and the like stored in the HDD 15 are transferred to the RAM 12, and the CPU 11 then appropriately makes access to the ROM 13 and the RAM 12 and executes software.

To the computer 10, an operation input device 30, such as a keyboard or a mouse, and a display 18 as a displaying apparatus are also connected. Further, connection to a printer 40 as a printing apparatus can be made via a printer I/O unit 19*b*. The printer 40 is a well-known printer that is capable of forming color images using a recording agent such as toner or ink of each color of cyan (C), magenta (M), yellow (Y), and black (K). The printer 40 forms one color image, for example, by forming monochromatic images with densities for each recording agent of each color while changing printing quantities of the recording agents on the basis of control signals expressed in 256 tone values of 0 to 255 for each recording agent and then superimposing such monochromatic images with each other.

As the computer 10 whose simplified structure is now explained, a generally configured personal computer can be used. Of course, computers applicable to the present invention are not limited to personal computers.

Although a suite of programs is stored in the HDD 15 in the present embodiment, the recording medium is not limited to this. Other recording media, for example, a floppy disk and a CD-ROM may be used. The programs stored in these recording media are read via a floppy disk drive or a CD-ROM drive, transferred into the computer 10, and installed in the HDD 15 or directly executed. Then, the programs are read into the RAM 12 and run for computer control. The recording medium is not limited to the above-mentioned ones, but a magneto-optic disk or the like may also be used. As a semiconductor device, a nonvolatile memory or the like such as a flash card can be used. Alternatively, the programs can be downloaded by accessing an external file server via a modem and over a communication network; in this case, the communication network is a transmission medium by which the invention is embodied for use.

Figure 2:
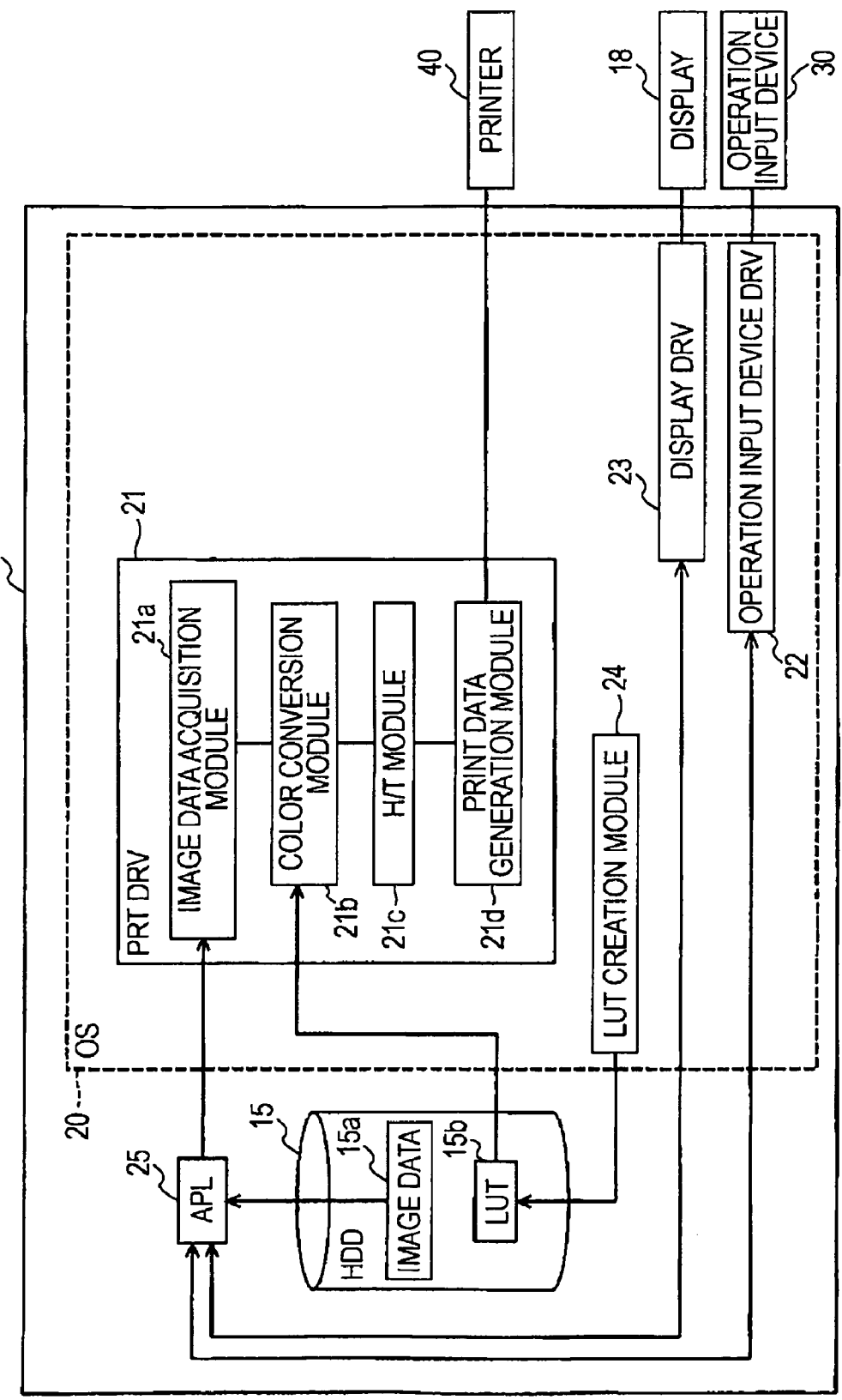
FIG. 2 is a block diagram showing a simplified software structure of the computer that executes the color conversion program according to the present embodiment.

On the computer 10 configured in accordance with the present embodiment, the OS 20 is installed in which a LUT creation module 24, a printer driver (PRTDRV) 21, an operation input device driver (DRV) 22, and a display driver (DRV) 23 are incorporated as shown in FIG. 2. The display DRV 23 is a driver for controlling the display of image data and the like in the display 18. The operation input device DRV 22 is a driver for receiving code signals input from the above-mentioned keyboard or mouse and receiving predetermined input operations.

The APL 25 is capable of executing a retouching process or the like by reading image data 15*a* recorded on a recording medium such as the HDD 15 into the RAM 12. Then, the display DRV 23 displays images on the display 18 on the basis of the image data 15a read into the RAM 12. When a user inputs instructions by operating the operation input device 30, the user instructions are acquired via the operation input device DRV 22 and interpreted. Then, the APL 25 performs various processing such as printing, retouching, or other processing, according to the user instructions.

Moreover, the user is able to print color images with the printer 40 by operating the operation input device 30 under the run of the APL 25. For this print operation, the PRTDRV 21 acquires the image data and performs color conversion so that the image data is expressed as a predetermined color that is inside a color gamut of the printer 40. As a result, images can be printed even when image data that is outside the color gamut of the printer 40 is input. The PRTDRV 21 includes an image data acquisition module 21a, a color conversion module 21b, a halftone processing module 21c, and a print data generation module 21d.

In the present embodiment, the image data 15a is dot-matrix data in which colors are expressed in tones of CMYK components for each pixel, for example, in compliance with the Japan Color standard. The image data obtained through color conversion from the image data 15a is dot-matrix data in which colors are expressed in tones of CMYK components, and is CMYK data specific to the printer 40. By altering an LUT 15b as required, it is possible to easily cope with changes in the models of the printer 40, changes in the media or inks used on the printer 40. Hereinafter, the CMYK data compliant with the Japan Color standard will be referred to as color values B1 ($C_1 M_1 Y_1 K_1$ data), and the CMYK data specific to the printer 40 will be referred to color values B2 ($C_2 M_2 Y_2 K_2$ data), respectively.

When the APL 25 receives a print execute instruction in the way described above, the image data 15a is acquired by the image data acquisition module 21a and the image data acquisition module 21a activates the color conversion module 21b. The color conversion module 21b is a module for converting the color values B1 into the color values B2, and under its control, respective dot data of the image data 15a are converted into $C_2 M_2 Y_2 K_2$ dot data. During this conversion, the color conversion module 21b performs interpolation computation by referring to the LUT 15b stored in the HDD 15. The LUT 15b is created by a later-described LUT creation module 24. Although the present embodiment is configured such that the previously created LUT 15b is acquired by the color conversion module 21b, the LUT creation module 24 may create the LUT 15b in response to a request from the color conversion module 21b and provide it to the color conversion module 21b.

When $C_2 M_2 Y_2 K_2$ tone data is generated by color conversion of the color conversion module 21b, the $C_2 M_2 Y_2 K_2$ tone data is handed over to the halftone processing module 21c. The halftone processing module 21c is a module for performing halftone processing in which $C_2 M_2 Y_2 K_2$ tone values of respective dots are converted so that they are expressed as recording densities of the recording agent (ink droplets, toners, or the like). In this processing, driving data for printing with the recording agent in the converted recording densities is generated. After the halftone processing, predetermined information such as image resolution is added, and print data is generated that is output to the printer 40 via the printer I/O unit 19b. Based on the print data, the printer 40 prints images.

(2) Print Operation

Next, a print operation in the above-mentioned structure will be described based on the flowchart shown in FIG. 3. Retouching and print execute instructions and the like can be input by choosing a corresponding menu on a display screen of the display 18 using the input device such as a mouse. When the user operates the mouse and clicks the mouse button while pointing the print menu with the pointer, the print execute instruction is issued and the image data 15a is handed over to the PRTDRV 21.

Figure 3:
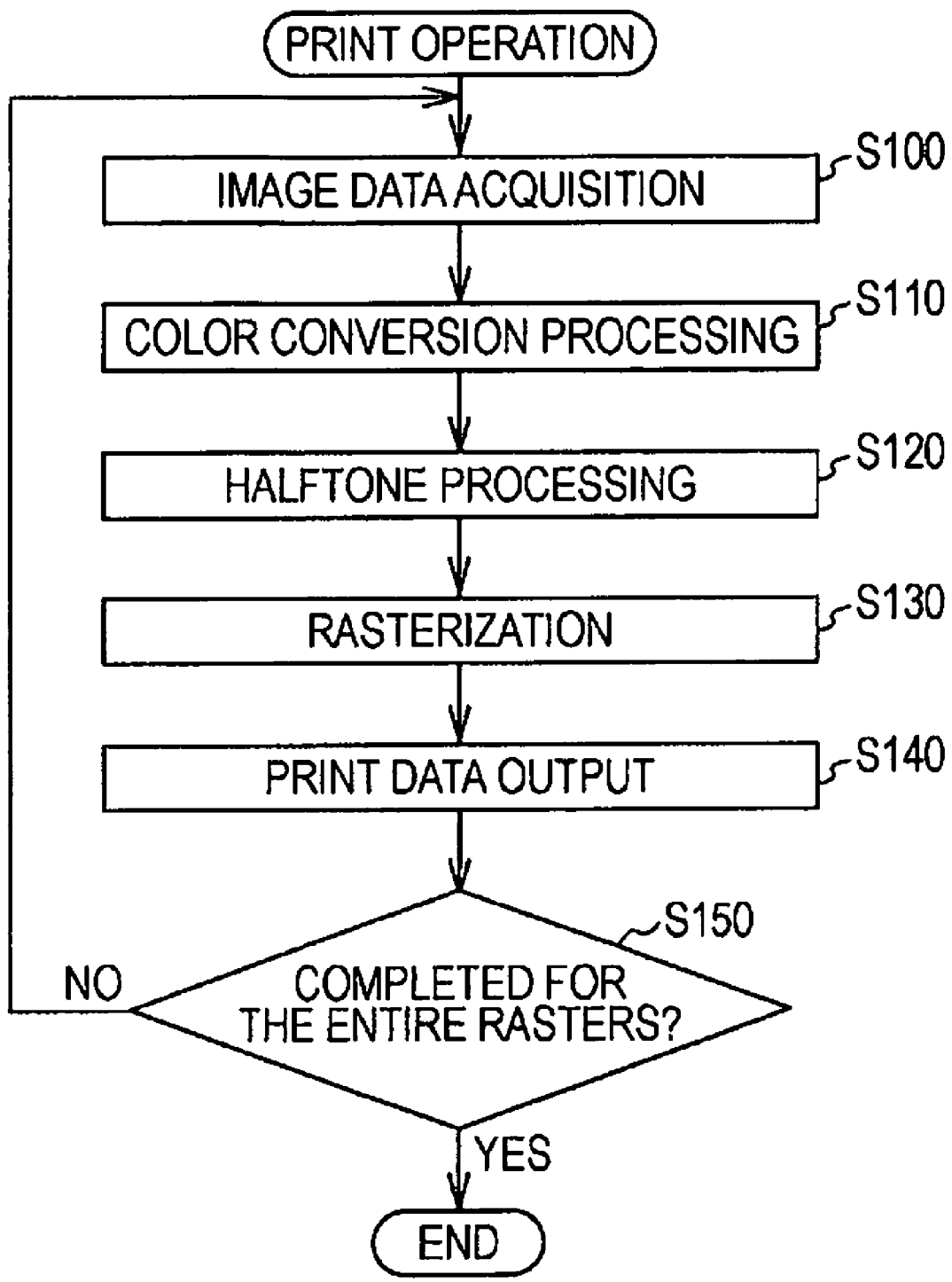
FIG. 3 is a flowchart illustrating a print operation.

Once the image data 15a has been handed over to the PRTDRV 21, the print operation illustrated in FIG. 3 starts. In step S100, image data 15a of an image A stored in the RAM 12 is acquired by the image data acquisition module 21a. Then, in step S110, the color conversion module 21b is activated and the RGB data of the respective dots of the image data 15a is converted to CMYK data. During this conversion, the color conversion module 21b generates CMYK data through interpolation computation by referring to the LUT 15b; however, the LUT 15b is created by performing a later-described LUT creation process. Therefore, the LUT 15b is configured as a table which maps a given color on the display 18 to a color showing high reproducibility while maintaining the tone properties on the printer 40.

After the color conversion process is performed, the dot matrix data after the color conversion is subjected to halftone processing in step S120 by the halftone processing module 21c. Furthermore, the data is subjected to rasterizing in step S130 by the print data generation module 21d, thereby generating print data. Then, the generated print data is output in step S140 via the printer I/o unit 19b. In step S150, a determination is made as to whether the entire rasters of the image data 15a have been processed by the color conversion process and the like. The step S100 and subsequent steps are repeated until it has been determined that the entire rasters have been processed As shown in FIG. 4, the LUT 15b is a table which maps tone data of the color values B1 to tone data of the color values B2 for several sample points. In step S110, the interpolation computation is executed based on these sample points, thereby mapping any CMYK tone values compliant with the Japan Color standard to CMYK tone values for the printer 40. As the method of interpolation computation, diverse techniques are publicly known and any of them is applicable. Next, a process of creating the LUT 15b will be explained.

(3) LUT Creation Process

In the LUT creation process of the present embodiment, the above-mentioned LUT 15b is created. This LUT creation process starts when the operation input device 30 is operated and the execution of this process is instructed. The LUT provided in accordance with the invention is created based on a profile PF1 (which is referred to when converting color values B1 to standard color values) and a profile PF2 (which is referred to when converting color values B2 to standard color values). Here, the standard color values are color values in a device-independent color space and are, for example, Lab values, XYZ values, and the like defined by the CIE. The profiles PF1 and PF2 are a group of data which consists of data such as conversion characteristic values (weights and the like) used when converting between the color values B1 or B2 and the standard color values. These profiles are stored in the ROM 13 of the computer 10. Hereinafter, the standard color values corresponding to the color values B1 of the profile PF1 will be described as standard color values $C_1$, and the standard color values corresponding to the color values B2 of the profile PF2 will be described as standard color values $C_2$, respectively.

Figure 5:
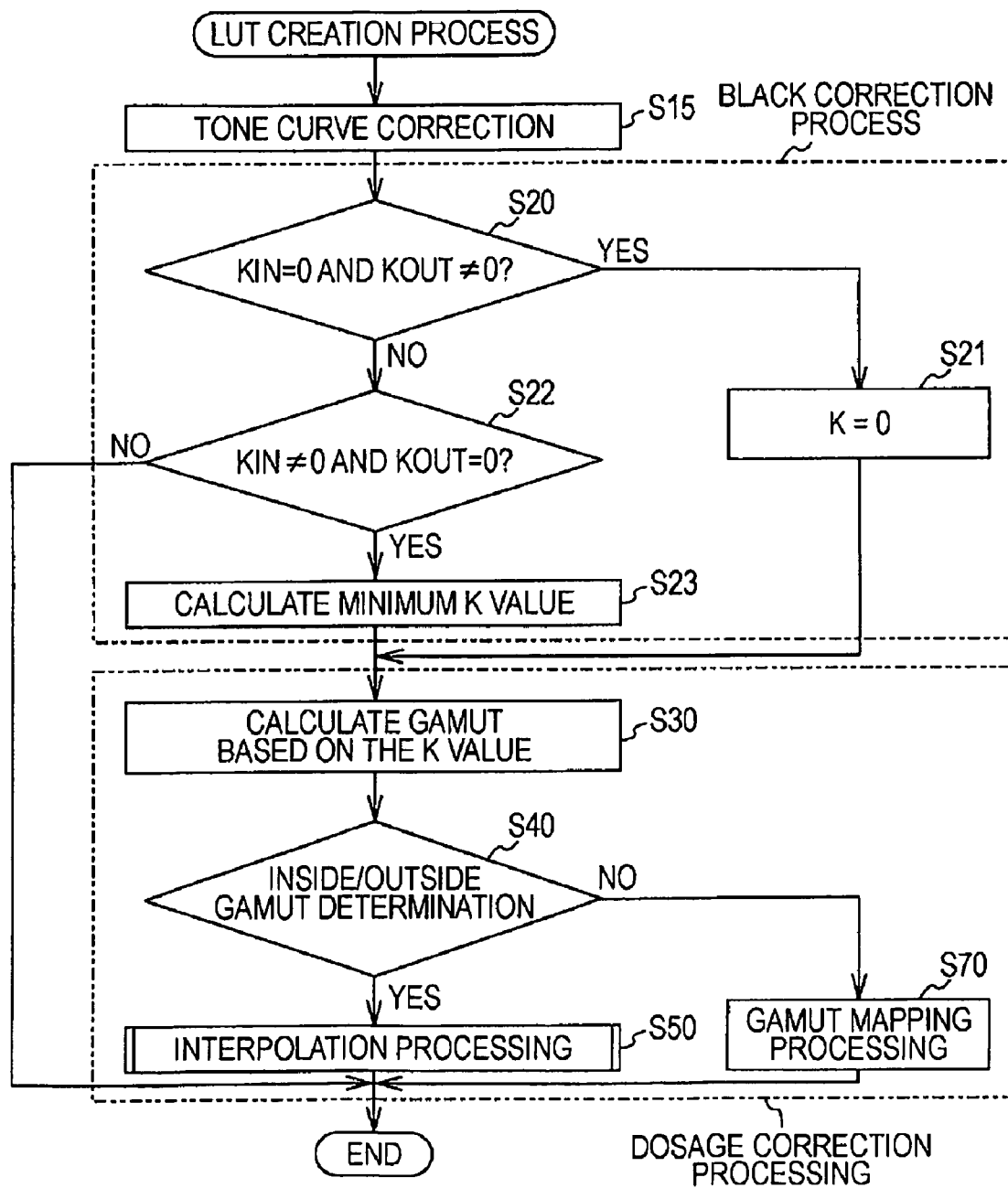
FIG. 5 is a flowchart illustrating an LUT creation process.

FIG. 5 is a flowchart illustrating the procedure of the LUT creation process according to the invention. The LUT creation process according to the invention consists of four processes: a black correction process, a recording agent limit quantity correction process, an interpolation process, and a gamut mapping process. In the present embodiment, the interpolation process and the gamut mapping process are executed as part of a dosage correction process.

(3-1) Black Correction Process

When the LUT creation process starts, profiles PF1 and PF2 are read from the HDD 15 in step S10, thereby creating an LUT 1 that defines the correspondence of the respective CMYK colors between the color values B1 and the color values B2 by using the read profiles PF1 and PF2. This LUT 1 is a general one in which a tone value of each of the CMYK color components of the color values B1 is evenly divided into 16 levels, and corresponding color values B2 are calculated on the basis of the profiles PF1 and PF2 with respect to $16^4$ sample color values B1 (hereinafter, referred to as grid points) which are combinations of color coordinates of respective division points serving as the basis of the division so that these color values B1 and color values B2 correspond to each other. The color values B2 other than the grid points are calculated by interpolation computation based on the color values of grid points surrounding the color values B2. The created LUT 1 is temporarily stored in the RAM 12 and is subjected to correction in later steps S15 to S70, such as user's tone curve correction, black correction, recording agent limit quantity correction, or gamut mapping.

Figure 6:
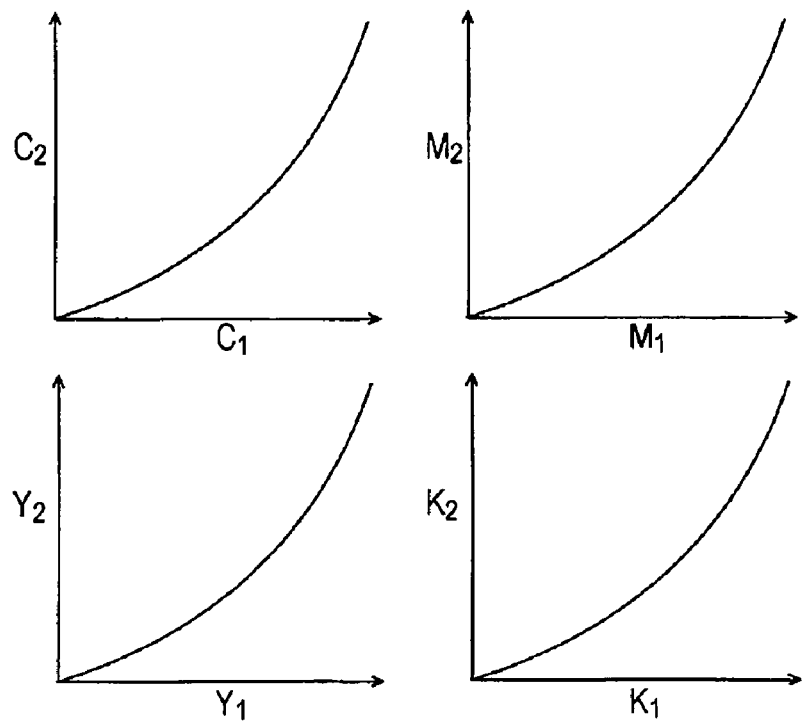
FIG. 6 shows an input/output tone curve.

In step S15, inputs for the tone curve correction are received. In this step, input/output tone curve as shown in FIG. 6 is displayed based on the LUT 1 stored in the RAM 12. Then, the user corrects the input/output tone curve in compliance with the user's preference or color reproduction policy while observing the input/output tone curve of FIG. 6, thereby creating a desired color correspondence. The LUT subjected to the tone curve correction is temporarily stored in the RAM 12 as a LUT 2. This tone curve correction is not always necessary to be executed as part of the LUT creation process, and a tone curve correction policy in compliance with the user's preference or color reproduction policy may be preliminarily stored in a storage medium so that the tone curve is read from the storage medium and automatically applied to the LUT 1.

In subsequent steps S20 to S23, the black correction process is performed. First, in step S20, a determination is made as to whether a grid point (C, M, Y, K)=$(c_2, m_2, y_2, k_2)$ (where, $k_2 \neq 0$) correspond to a grid point (C, M, Y, K)=$(c_1, m_1, y_1, 0)$ of the color values B1 in the LUT 2. When the determination result shows that a corresponding grid point exists, the flow proceeds to step S21, where $k_2$ of the corresponding grid point is corrected to 0, and the flow proceeds to step S30. That is, when $k_1=0$ is input as the color values B1, the LUT 2 is corrected so that $k_2=0$ is output as the output color values B2. When it is determined in step S20 that the corresponding grid point does not exist, the flow proceeds to step S22.

In step S22, a determination is made as to whether grid point (C, M, Y, K)=$(c_2, m_2, y_2, 0)$ correspond to a grid point (C, M, Y, K)=$(c_1, m_1, y_1, k_1)$ (where, $k_1 \neq 0$) of the color values B1 in the LUT 2. When the determination result shows that a corresponding grid point exists, the flow proceeds to step S23, where correction is made so that $k_2 \neq 0$ is output, while this LUT creation process ends when the corresponding grid point does not exist. That is, when $k_1 \neq 0$ is input as the color values B1, the LUT 2 is corrected so that $k_2 \neq 0$ is output as the output color values B2.

Here, a situation where the color values B1 of $k_2=0$ corresponds to the color values B1 of $k_1 \neq 0$ in the LUT 2 will be described. Such a situation occurs, for example, when the user has executed the tone curve correction. In the tone curve correction, since output values are sometimes corrected to be lower than input values in a low-tone region, there is a possibility that the output K value is smaller than a quantization threshold of tone values 0 and 1. Values smaller than the quantization threshold, though larger than 0, are converted to 0 when they are stored as grid points of the LUT. Besides, due to mapping between the color values B1 and the color values B2 in a color space where black is not differentiated from black expressed by the equal CMY values, as in the case of the Lab color space, the black quantity is changed when mapping from the Lab color space to the CMYK color space, thereby leading to the above-mentioned correspondence. Hereinafter, a situation where the color values B1 of $k_2=0$ corresponds to the color values B1 of $k_1 \neq 0$ as the result of the tone curve correction will be described with reference to FIG. 7.

Figure 7:
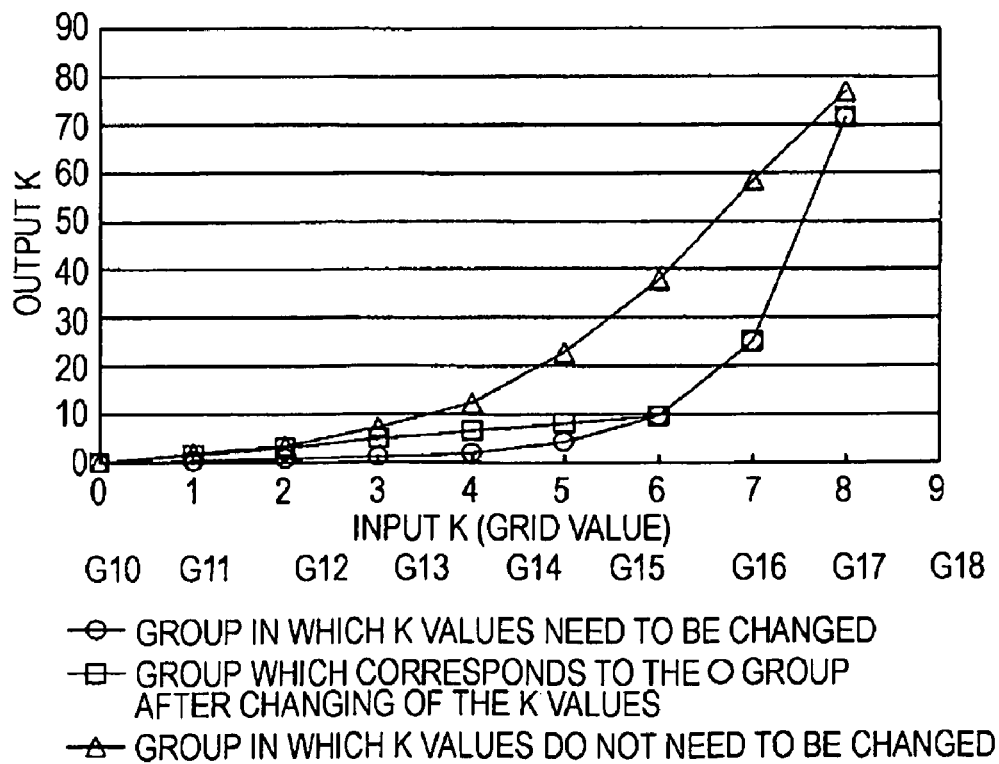
FIG. 7 shows an example of a tone curve for explaining a black correction operation.

FIG. 7 shows an input/output tone curve of $k_1$ and $k_2$. In the drawing, the quantization threshold is a tone value of 1, and when the LUT is created based on the tone curve, K values smaller than the tone value of 1 are recorded as 0. For the group denoted by Δ in FIG. 7, the entire K values corresponding to the grid points are greater than or equal to 1, and outputs of $K_2 \neq 0$ are always made for inputs of $K_1 \neq 0$. However, for the group denoted by O, the first grid points and the second grid points are all smaller than or equal to 1 and are thus converted to a tone value of 0 when recorded in the LUT. That is, if the color conversion is performed by referring to the LUT created based on the tone curve of the group denoted by O in FIG. 7, even when the users performs the tone curve correction with an intention of achieving a predetermined gradation, no gradation occurs between the zeroth grid point and the second grid point, resulting in no reflection of the user' intention.

In step S23, grid points having $k_2$ smaller than the quantization threshold are corrected to values greater than the quantization threshold. In the present embodiment, the black correction is executed using a linear interpolation method for best processing speed; however, other interpolation methods such as the bezier curve interpolation or the spline curve interpolation may be used.

The linear interpolation for the group denoted by O in FIG. 7 will be described. The LUT creation module 24 compares the $k_2$ values corresponding to the grid points G10, G11, G12, G13, G14, . . . , and so on with the quantization threshold Th (which is set to 1 in FIG. 7) in order, thereby searching for the grid points corresponding to the $k_2$ values smaller than the quantization threshold Th. However, since the $K_1$ and $K_2$ generally have a positive correlation even after the tone curve correction, only the $k_2$ value at the smallest grid point may be compared with the quantization threshold Th.

When the grid point corresponding to the $k_2$ value smaller than the quantization threshold Th exists, the $k_1$ value (hereinafter, referred to as A) of the grid point is acquired. Then, a straight line Line having a slope of Th/A is drawn from the origin in the graph of FIG. 7. Let the $k_1$ value at the intersection of the straight line Line and the tone curve before correction be C, the $k_2$ values of the grid points in the range of 0 to C are corrected to fall on the straight line Line. That is, the $k_2$ values of the grid points in the range of 0 to C are linearly interpolated using the straight line Line. The grid points having the $k_1$ values greater than or equal to C are not corrected. The black-corrected LUT is stored in the RAM 12 as an LUT 3. In this way, by performing the black correction in consideration of the quantization threshold, an LUT capable of outputting black in which the user-intended tone curve is reflected, and by performing the black correction using the linear interpolation, high-speed processing can be performed.

(3-2) Recording Agent Limit Quantity Correction Process

In the LUT 3 created by the above-mentioned LUT creation process, there is a case where the black level increases as the result of the black correction. The increased black level may sometimes increase a recording agent quantity for each pixel. In this case, if the recording agent was toner, the printing paper may be wound around a fixing machine due to the large quantity of toner, thus making it difficult to print properly. Further, a drop in image quality also results when printing is performed such that so-called blurring caused by the scattering of toner, is generated, and therefore fine lines and the like run. If the recording agent was ink, the recording agent quantity may exceed the maximum ink quantity (hereinafter, referred to as maximum dosage) that a predetermined area of recording medium can absorb. Therefore, the CMY quantities are adjusted in consideration of a recording agent limit quantity Dmax. More specifically, the CMY quantities corresponding to the closet hue value are calculated within a range of the recording agent limit quantity Dmax, and the calculated CMY quantities are set as the color values B2. Next the recording agent limit quantity correction process in steps S30 to S60 of FIG. 5 will be described.

Figure 8:
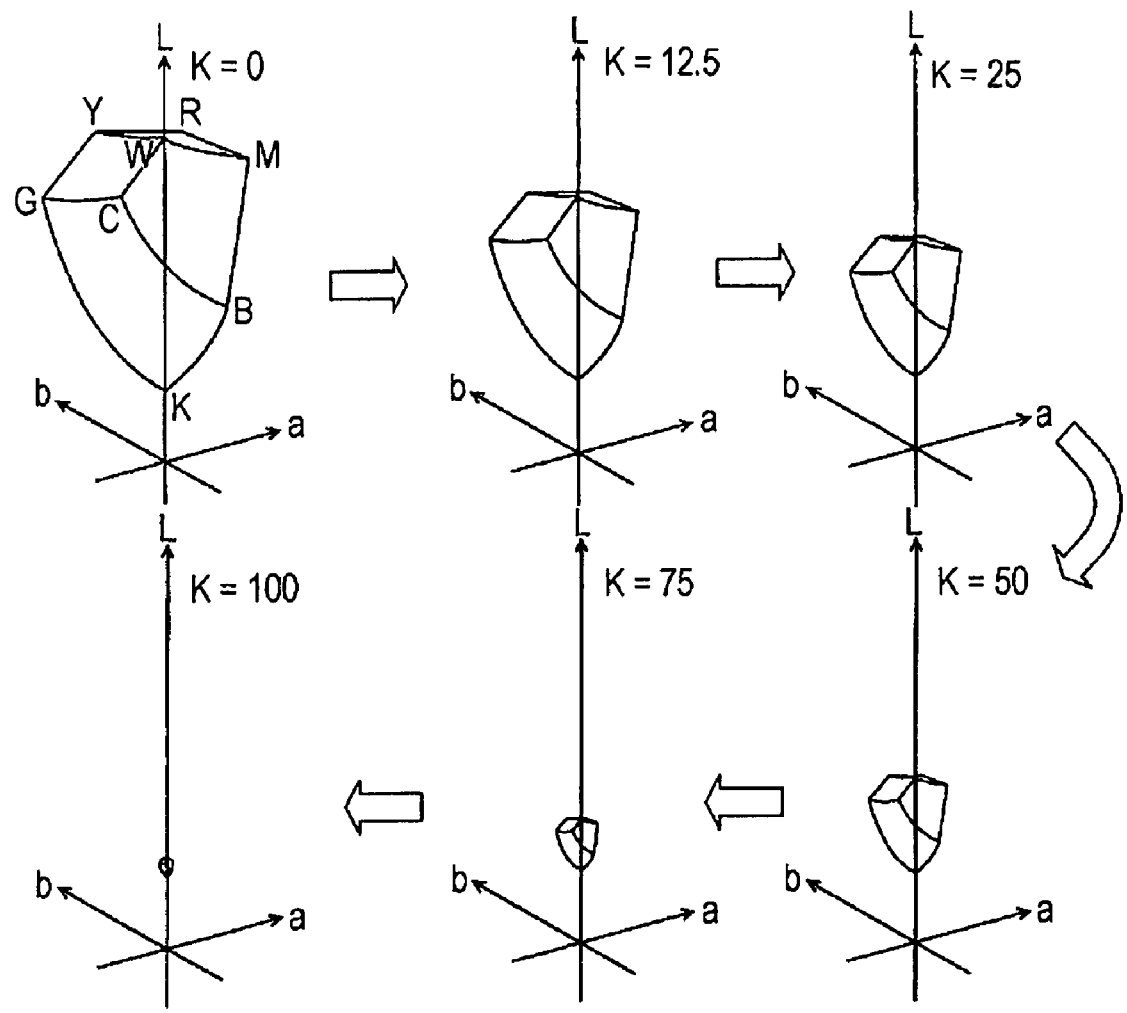
FIG. 8 shows an example of a CMYK gamut calculated with fixed black.

In step S30, CMY gamut information at each K value is calculated based on the LUT 3. For example, values having the same $k_2$ value are extracted from the color values B2 registered in the LUT 3 and plotted in the Lab color space, thereby forming a CMYK gamut at the given $k_2$ value. FIG. 8 shows gamut diagrams formed in the Lab color space for each value of $K_2$ (=0, 12.5, 25, 50, 75, 100). As shown in the drawing, the gamut representing an area expressible by the CMY values of the color values B2 gradually shrinks as the K value increases. In the present embodiment, for K values other than $K_2$ (=0, 12.5, 25, 50, 75, 100), the values are calculated by linear interpolation using Formula 1. That is, when calculating the gamut at K=20, $K_1$ and $K_2$ of a variable Rate are substituted with 12.5 and 25, respectively, and the Lab values at K (=12.5, 25) are added with a weight of the Rate.

Formula 1

$$\left. \begin{array}{l} L = L_1 \cdot (1 - \text{Rate}) + L_2 \cdot \text{Rate} \\ a = a_1 \cdot (1 - \text{Rate}) + a_2 \cdot \text{Rate} \\ b = b_1 \cdot (1 - \text{Rate}) + b_2 \cdot \text{Rate} \end{array} \right\} \quad (1)$$

$$\text{Rate} = \frac{K - K_2}{K_2 - K_1} \quad (K_1 < K < K_2)$$

Figure 9:
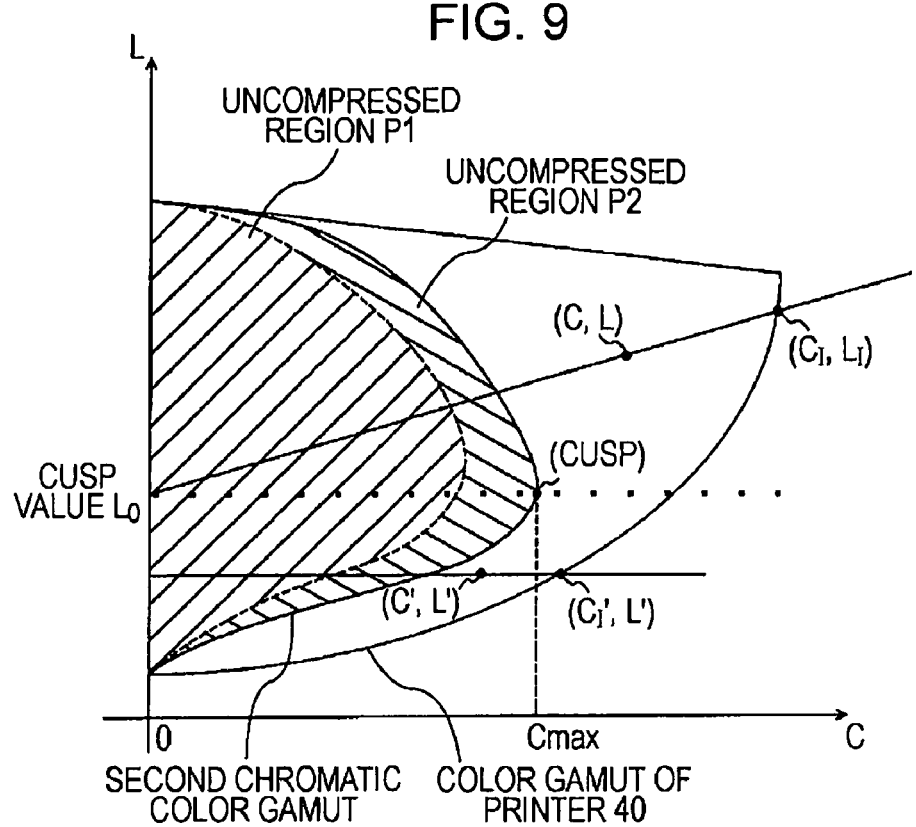
FIG. 9 is a diagram for explaining a compression algorithm in a gamut mapping process.

Next, in step S40, based on the calculated gamut information, an inside/outside color gamut determination is made for the respective grid points of the LUT. In the present embodiment, as described later, since two different gamut mapping processes (color gamut conversion processes) are performed depending on a lightness, first, a determination is made as to which lightness region for executing which of the gamut mapping processes, an input lightness belongs. FIG. 9 is a schematic diagram showing a state where a color gamut (a color gamut of the printer 40) of the color values B2 before black correction and a color gamut (hereinafter, referred to as a second chromatic color gamut) of the color values B2 after black correction, expressible by $C_2M_2Y_2$ values without changing the quantity of $k_2$ within an ink duty limit are cut on an ab plane in the Lab space. In the drawing, the horizontal axis represents a chroma C (=$(a^2+b^2)^{1/2}$), and the vertical axis represents a lightness L.

In the color gamut conversion process of the present embodiment, different mapping algorithms are used on the high-lightness and low-lightness sides, based on a boundary of a lightness $L_0$ of the coordinates ($C_{max}$, $L_0$) representing the maximum chroma $C_{max}$ in the second chromatic color gamut cut at each hue angle. Hereinafter, ($C_{max}$, $L_0$) will be referred to as a cusp, and the lightness at the cusp will be referred to as a cusp value. As shown in FIG. 9, the compression algorithm of the present embodiment employs different compression algorithms on the high-lightness side and the low-lightness side of the cusp value. That is, on the high-lightness side of the cusp value, an algorithm (first compression algorithm) which compresses both chroma and lightness while placing much value on maintaining the lightness is employed as in the case of the SGCK (Sigmoidal Gaussian Cusp Knee) algorithm, for example. On the low-lightness side of the cusp value, an algorithm (second compression algorithm) which compresses chroma while maintaining the lightness is employed as in the case of the BasicPhoto (the registered trademark of Microsoft). The following description will be made by way of example of the SGCK and BasicPhoto algorithms.

In the respective compression algorithms, an inside/outside determination is made, first, as to whether the color gamut of the printer 40 falls inside the second chromatic color gamut. In the present embodiment, a region of the second chromatic color gamut corresponding to 90% to 100% in chroma is set as a compression destination, and color points included in the compression destination and color points disposed outside the second chromatic color gamut are linearly compressed to this compression destination. That is, the inside/outside determination is made by determining whether it falls within 90% in chroma of the second chromatic color gamut. Hereinafter, a region falling within 90% in chroma of the second chromatic color gamut will be referred to as a uncompressed region, a region outside the uncompressed region will be referred to as a compressed region, and a region corresponding to 90% to 100% in chroma of the second chromatic color gamut will be referred to as a compression destination region.

In the inside/outside determination of the SOCK algorithm, a determination is made as to whether an intersection ($C_I$, $L_I$) of a straight line connecting a point (0, $L_0$) and a determination target color point (C, L) and an outer shell of the color gamut of the printer 40 falls within the uncompressed region. On the other hand, in the inside/outside determination of the BasicPhoto algorithm, a determination is made as to whether an intersection ($C_I'$, $L'$) of a straight line L=L' containing the determination target color point (C', L') and the outer shell of the color gamut of the printer 40 falls within the uncompressed region. Here, the reason why the intersection ($C_I$, $L_I$) is used as the determination target for the inside/outside determination of the SGCK algorithm and the intersection ($C_I'$, L') is used as the determination target for the inside/outside determination of the BasicPhoto algorithm is that the compression direction of the SGCK algorithm corresponds to the direction of (0, $L_0$) and the compression direction of the BasicPhoto algorithm corresponds to the direction of L=L'. Therefore, in a different compression algorithm, the inside/outside determination is made as to whether an intersection of a straight line extending from the determination target color point in the compression direction and the outer shell of the color gamut of the printer 40 falls within the uncompressed region.

For the color points for which the intersection is determined in the inside/outside determination to fall within the second chromatic color gamut, the interpolation process of later-described steps S50 to S56 is performed. On the other hand, the color points, for which the intersection ($C_I$, $L_I$) or ($C_I'$, L') is determined in the inside/outside determination to belong to the compressed region, are linearly compressed in the gamut mapping process of step S70 to be mapped to the compression destination region.

In the present embodiment, although the uncompressed region P1 is described as being 90% of the second chromatic color gamut, it is not limited to this percentage and any percentage in the range of 0 to 100 may be appropriately used. Moreover, it is not always necessary to apply the same percentage over the entire lightness range, but various ranges may be set by changing the size of the uncompressed region P1 in each lightness value as long as the uncompressed region P1 expands inside the second chromatic color gamut while including the outer shell of the second chromatic color gamut.

(3-3) Gamut Mapping Process

Figure 10:
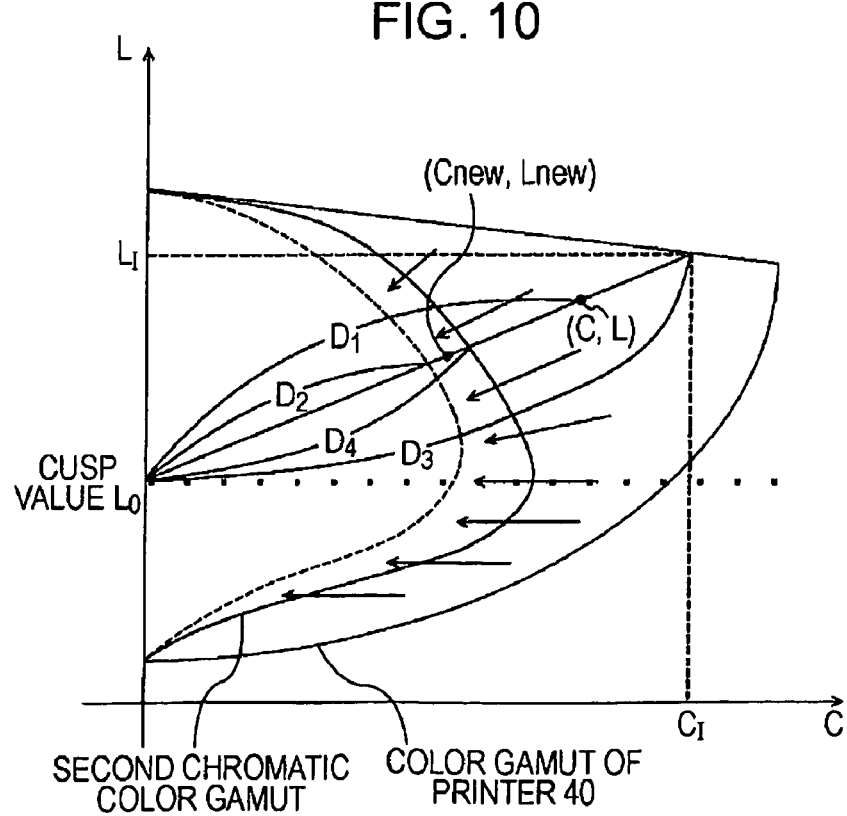
FIG. 10 is a diagram for explaining an SGCK algorithm.

When the inside/outside color gamut determination ends and the flow proceeds to step S70, in the SGCK algorithm, the linear mapping as shown in FIG. 10 is performed on the compression target color points. FIG. 10 is a diagram for explaining the SGCK algorithm. The mapping shown in the drawing can be expressed, for example, by Formula 2.

Formula 2

$$C_{new} = C \left( \frac{D_2 + \frac{(D_4 - D_2)(D_1 - D_2)}{D_3 - D_2}}{D_1} \right)$$

$$J_{new} = J_0 + (J - J_0) \left( \frac{D_2 + \frac{(D_4 - D_2)(D_1 - D_2)}{D_3 - D_2}}{D_1} \right)$$

(2)

Here, (C, L) is the coordinate of the color point before compression, and ($C_{new}$, $L_{new}$) is the coordinate of the color point after compression. On a straight line connecting a point (0, $L_0$) and the color point (C, L), a distance from (0, $L_0$) to the color point is defined as $D_1$, a distance from (0, $L_0$) to the outer shell of the uncompressed region P1 is defined as $D_2$, a distance from (0, $L_0$) to the outer shell of the color gamut of the printer 40 is defined as $D_3$, and a distance from (0, $L_0$) to the outer shell of the second chromatic color gamut is defined as $D_4$.

That is, in Formula 2, a distance ($C_1$–$D_2$) from the outer shell of the uncompressed region P1 to the color point is multiplied by a ratio of a distance ($D_3$–$D_2$) from the outer shell of the uncompressed region P1 to the outer shell of the color gamut of the printer 40 to a distance ($D_4$–$D_2$) from the outer shell of the uncompressed region P1 to the outer shell of the second chromatic color gamut, thereby normalizing the positional relationship of the color point between the outer shell of the uncompressed region P1 and the outer shell of the color gamut of the printer 40 into a range between the outer shell of the uncompressed region P1 and the outer shell of the second chromatic color gamut and performing reproduction. By the above-described compression, the color points on the high-lightness side of the cusp value among the color points outside the second chromatic color gamut are mapped into the compressed region P2 inside the second chromatic color gamut with the lightness and the chroma being compressed. The compression algorithm of Formula 2 is an example only and the mapping may be performed by a nonlinear algorithm without being limited to linear mapping.

Figure 11:
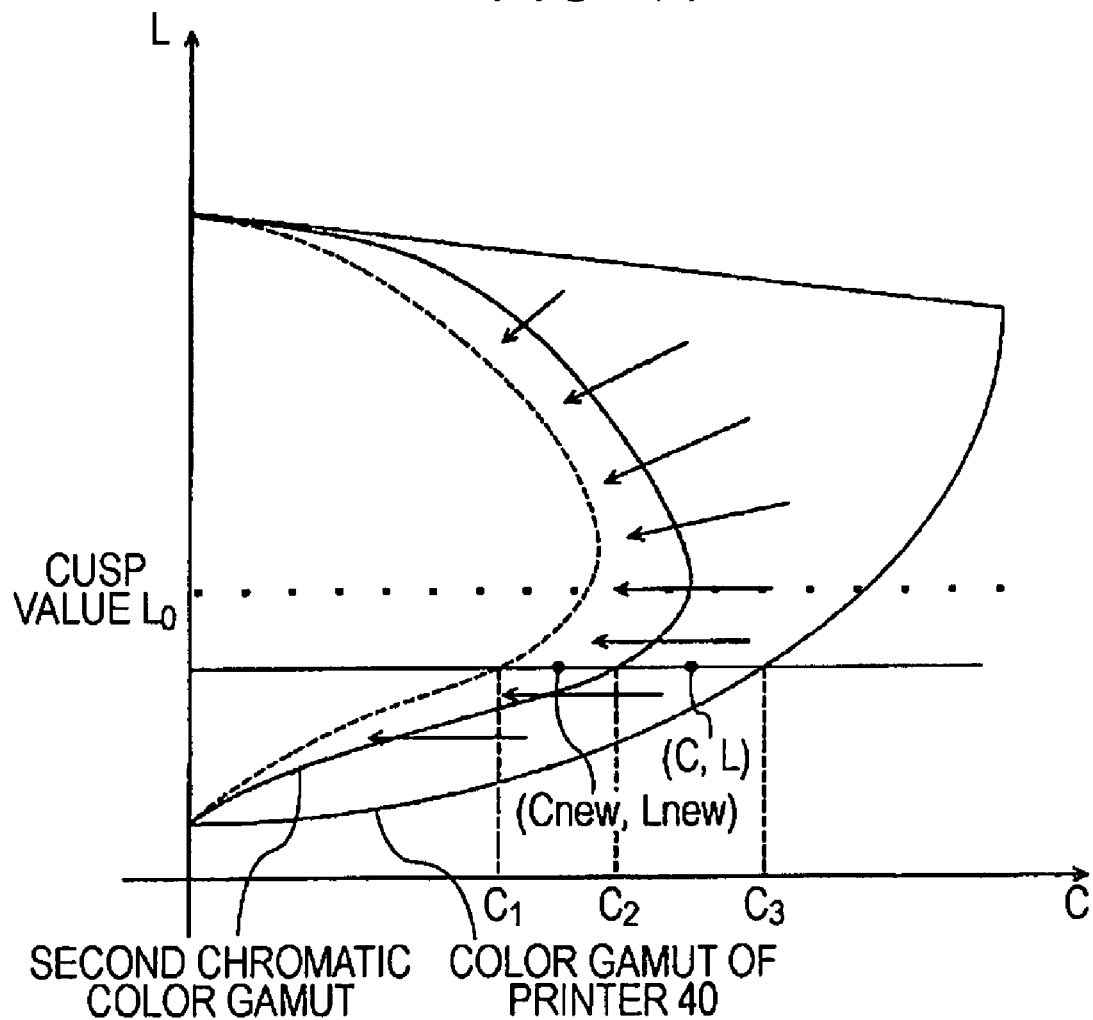
FIG. 11 is a diagram for explaining a BasicPhoto algorithm.

On the other hand, in the BasicPhoto algorithm, the linear mapping as shown in FIG. 11 is performed on the compression target color points. FIG. 11 is a diagram for explaining the BasicPhoto algorithm. The mapping shown in the drawing can be expressed, for example, by Formula 3.

Formula 3

$$C_{new} = C_1 + \frac{(C_2 - C_1)(C - C_1)}{C_3 - C_1}$$

$$J_{new} = J$$

(3)

Here, (C, L) is the coordinate of the color point before compression, and ($C_{new}$, $L_{new}$) is the coordinate of the color point after compression. Moreover, a chroma of the outer shell of the uncompressed region P1 at a lightness value L is defined as $C_1$, a chroma of the outer shell of the second chromatic color gamut at a lightness value L is defined as $C_2$, and a chroma of the outer shell of the color gamut of the printer 40 at a lightness value L is defined as $C_3$. In Formula 3, a distance (C–$C_1$) from the outer shell of the uncompressed region P1 to the color point is multiplied by a ratio of a distance ($C_3$–$C_1$) from the outer shell of the uncompressed region P1 to the outer shell of the color gamut of the printer 40 to a distance ($C_2$–$C_1$) from the outer shell of the uncompressed region P1 to the outer shell of the second chromatic color gamut, thereby normalizing the positional relationship of the color point between the outer shell of the uncompressed region P1 and the outer shell of the color gamut of the printer 40 into a range between the outer shell of the uncompressed region P1 and the outer shell of the second chromatic color gamut and performing reproduction. By the above-described compression, the color points on the low-lightness side of the cusp value among the color points outside the second chromatic color gamut are mapped into the compressed region P2 inside the second chromatic color gamut with the chroma being compressed while maintaining the lightness. The compression algorithm of Formula 3 is an example only and the mapping may be performed by a nonlinear algorithm without being limited to linear mapping.

In the above-described SGCK algorithm, the extent of compression of the lightness increases as it goes away from the cusp value and the extent of compression of the lightness decreases as it gets closer to the cusp value, so that the compression ratio of the lightness becomes 0 at the cusp value $L_0$. In the case of the BasicPhoto algorithm, the lightness maintains constant regardless of the magnitude of the lightness. That is, the compression ratio and the compression direction at the cusp value are the same in the SGCK and BasicPhoto algorithms. Therefore, even when different compression algorithms are used before and after the cusp value, continuity at the cusp value between the color points after mapping can be ensured and lightness inversion in the vicinity of the cusp value can be prevented. With the prevention of the lightness inversion, a gamut mapping resulting in a printing result which gives natural impression to the human eyes that are more sensitive to lightness than chroma can be realized.

FIGS. 12A to 12C are diagrams for explaining the operational effect of the above-described use of different compression algorithms before and after the cusp value. These drawings illustrate the tone properties of black, in which image data having continuously varying lightness values of black in the vertical direction are printed by mapping with the respective compression algorithms. FIG. 12A shows the printing result when mapping was performed over the entire lightness range using the BasicPhoto algorithm, FIG. 12B shows the printing result when mapping was performed over the entire lightness range using the SGCK algorithm, and FIG. 12C shows the printing result when mapping was performed using the compression algorithm according to the invention. The printing result of FIG. 12A, in which the mapping was performed using the BasicPhoto algorithm, shows that the tone representation is not sufficient at high tone value in the upper part of the drawing, and the printing result of FIG. 12B, in which the mapping was performed using the SGCK algorithm, shows the lightness value changes abruptly at some positions in the dark area, and therefore, the tone properties in the dark area is poor and the blackout condition occurs. To the contrary, the printing result of FIG. 12C, in which the mapping was performed with the gamut mapping process of the present embodiment, shows that the tone representation is rich at high chroma values and the tone properties in the dark area are maintained.

Figure 13:
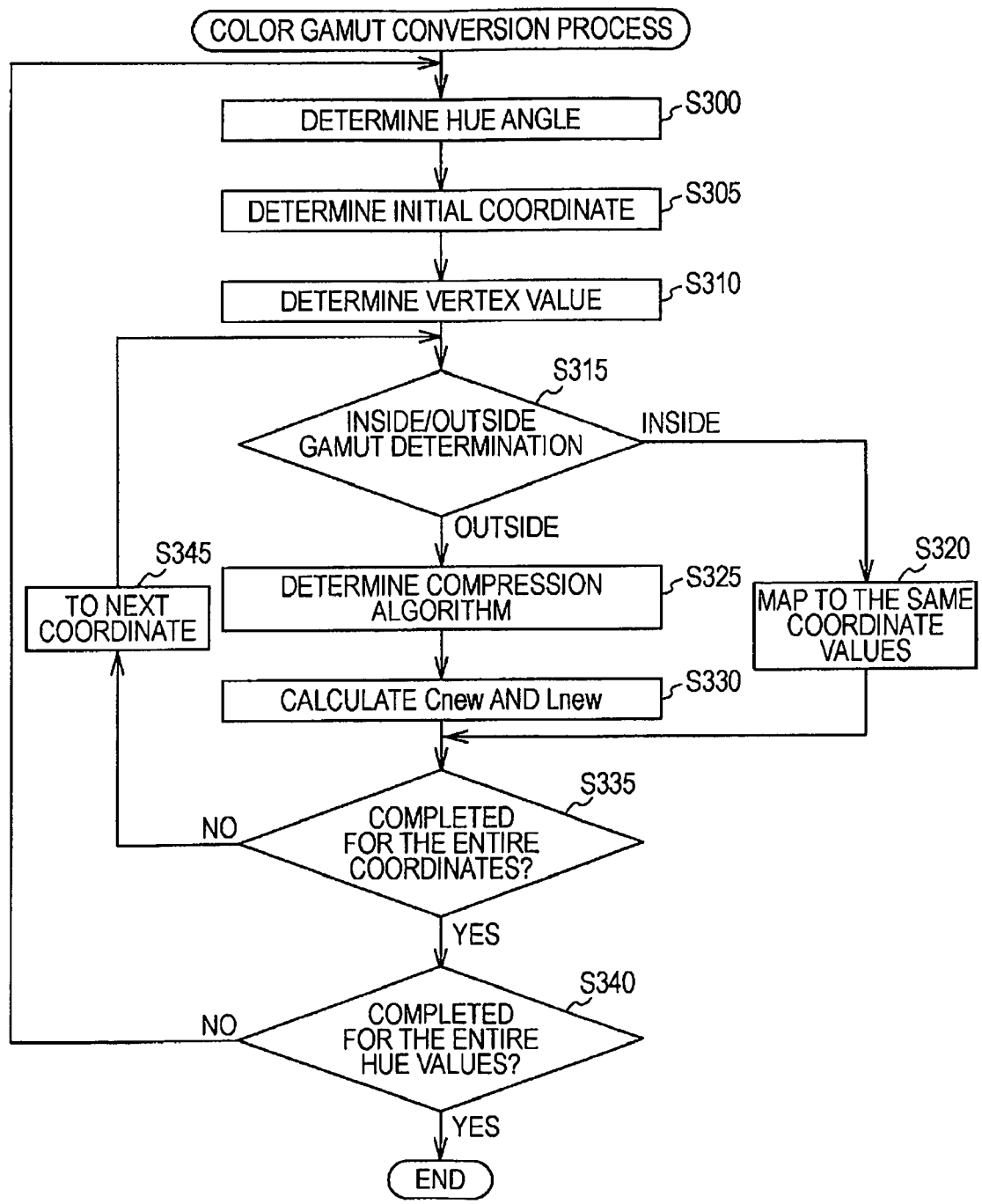
FIG. 13 is a flowchart illustrating a gamut mapping process.

FIG. 13 is a flowchart of the gamut mapping process which is performed using Formulas 1 and 2. In the drawing, first, a hue angle θ to be processed is determined in step S300 and an initial coordinate (C, L) at the hue angle θ is determined in step S305. Then, a cusp value $L_0$ of the second chromatic color gamut at the hue angle θ is acquired in step S310, and an inside/outside determination for the second chromatic color gamut is performed on the color point of the initial coordinate in step S315. When the inside/outside determination result shows that the color point falls within the second chromatic color gamut, the color point is mapped to a color point of the second chromatic color gamut having the same coordinate value as the initial coordinate (C, L) in step S320. On the other hand, when the inside/outside determination result shows that the color point falls outside the second chromatic color gamut, a determination is made in step S325 as to which compression algorithm will be used based on the cusp value acquired in step S310. Then, in accordance with the determined compression algorithm, the coordinate ($C_{new}$, $L_{new}$) of the compression destination is determined in step S330, and the color point is mapped to this coordinate.

When the mapping of the coordinate (C, L) is completed by the processes of steps S315 and S330, a determination is made in step S335 as to whether the computations for the coordinate ($C_{new}$, $L_{new}$) have been completed for the entire coordinates. Since this gamut mapping process is performed as part of the LUT creation process, it is not necessary to determine whether the computations have been completed for the entire coordinates but only necessary to determine whether the computations have been completed for the coordinates necessary for creating the LUT. Therefore, various modes may be employed, for example, a mode where only integer coordinate values are computed, and a mode where only grid points at predetermined pitches in the Lab space are computed.

When it is determined in step S335 that the computations have not yet been completed for the entire coordinates, a subsequent computation candidate coordinate (C, L) is set in step S345 and processes of step S315 and subsequent steps are repeated. When it is determined in step S335 that the computations have been completed for the entire coordinates, a determination is made in step S340 as to whether the gamut mapping process has been completed for the entire hue values, and the processes of step S300 and the subsequent steps are repeated until it is determined that the gamut mapping process has been completed for the entire hue values.

The gamut mapping process according to the invention can be applied not only to the above-mentioned case of creating a static LUT but also to a case of dynamically calculating and creating mapping destinations for input sRGB values. In the case of continuously processing the color points of the hue angles as in the case of the LUT creation, it is good in terms of processing efficiency to perform determination on the cusp value in step S310 before the inside/outside color gamut determination in step S320 as illustrated in the flowchart. However, in the case where the hue angle of the color points input in the dynamic mapping process varies randomly, it may be good in terms of processing efficiency to perform determination on the cusp value in step S310 after the inside/outside color gamut determination in step S320.

In the above-described embodiment, the gamut mapping is performed using the SGCK algorithm on the high-lightness side of the cusp value $L_0$ of the second chromatic color gamut, and the gamut mapping is performed using the BasicPhoto algorithm on the low-lightness side. In addition to switching the compression algorithms before and after the cusp value, for example, the compression algorithms may be switched depending on the extent of similarity of the outer shell shape. For example, when a color gamut having an externally convex outer shell shape is mapped to a color gamut having an internally convex outer shell shape, changes in lightness and chroma values are emphasized too much, having a great influence on the tone properties particularly. Considering such circumstance, a configuration may be employed in which a lightness-maintaining compression algorithm that maintains the tone properties is applied when the swelling direction of the outer shell shape is different and an compression algorithm that compresses the lightness and chroma is applied when the swelling direction of the outer shell shape is identical. According to this configuration, the tone properties can be appropriately maintained in accordance with the color gamut shape.

(3-4) Interpolation Process

Figure 14:
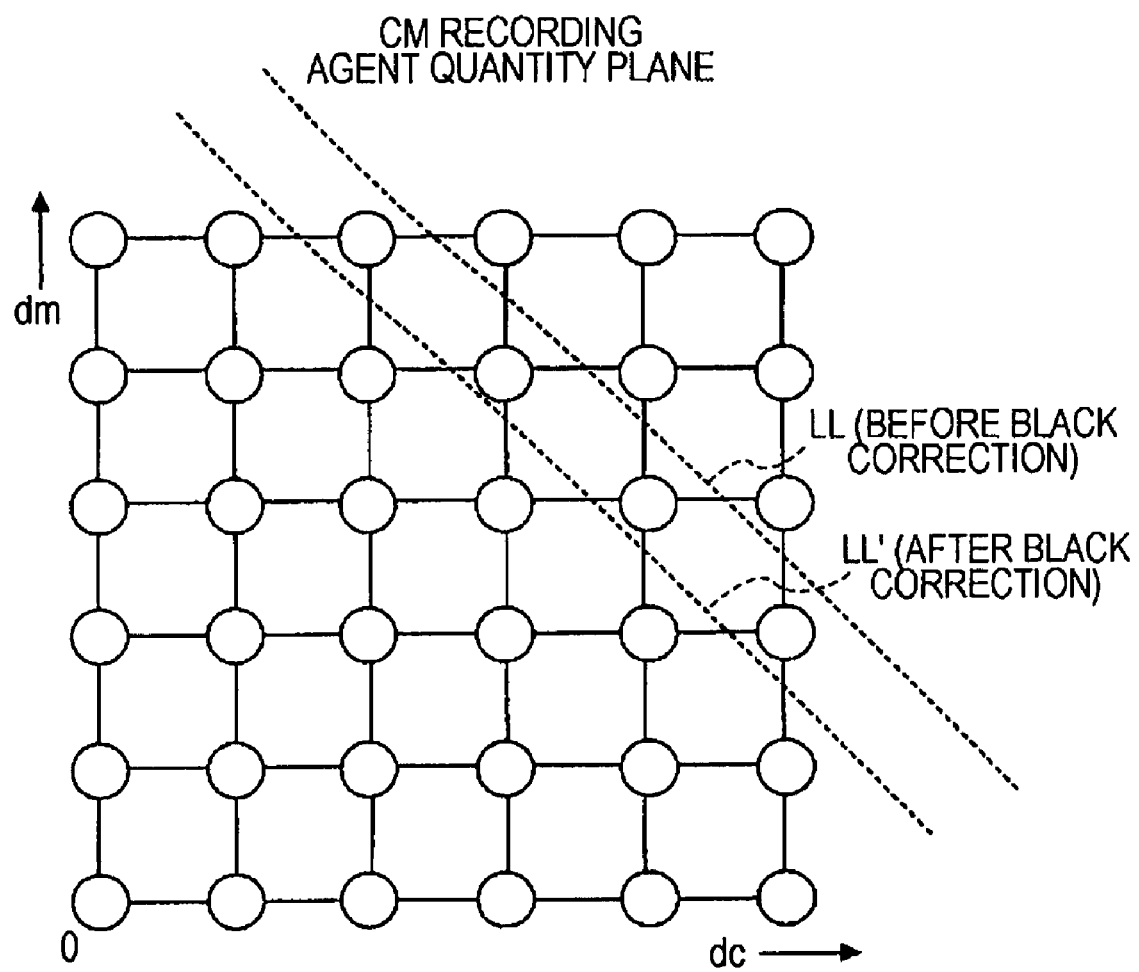
FIG. 14 is a diagram for explaining recording-agent duty limit.

FIG. 14 shows a CM plane (a plane where YK recording agent quantities have constant values) in the color space of the color values B2, in which the vertical axis represents a tone value of a C recording agent, and the horizontal axis represents a tone value of an M recording agent. In the drawing, grid points which are equivalent to the tone values of the C and M recording agents are formed, and these grid points correspond to the grid points described in the profile PF2. Although not shown, equivalent grid points are formed with respect to the tone values of other recording agents (Y and K).

In FIG. 14, a boundary line LL between a valid region and an invalid region of recording agent limit is drawn at a position where the tone values of the C and M recording agents are increased to some extent. This boundary line LL means an upper limit of combination of the C and M recording agent quantities, i.e., a recording agent limit quantity Dmax, which the printer 40 can adhere onto the printing paper when the Y and K recording agent quantities have predetermined values. For example, a region where no bleeding or blurring of the recording agent on the printing paper is defined as the valid region, and the outer border of the valid region is defined by the boundary line LL. Allowing the printer 40 only to use with the tone values inside the valid region makes it possible to control the printing result with high precision without being influenced by the bleeding or blurring of the recording agent. The boundary line LL can be defined depending on the hardware of the printer 40 for which the printing result is estimated, the physical property of the recording agent, the surface property of the printing paper, or the printing environment. The valid region in the recording agent quantity space corresponds to the gamut which can be actually reproducible by the printer 40.

However, since the total recording agent quantity increases when the tone value of the K recording agent is increased by the above-described black correction process, the tone values of the C, M, and Y recording agents must be decreased. That is, when the quantity of the K recording agent is increased by the black correction, the boundary line LL shifts to the boundary line LL'. Therefore, in the interpolation process for calculating the color values B2 corresponding to the grid points of the profile PF1, a limitation is placed by the recording agent limit quantity of the boundary line LL'.

Figure 15:
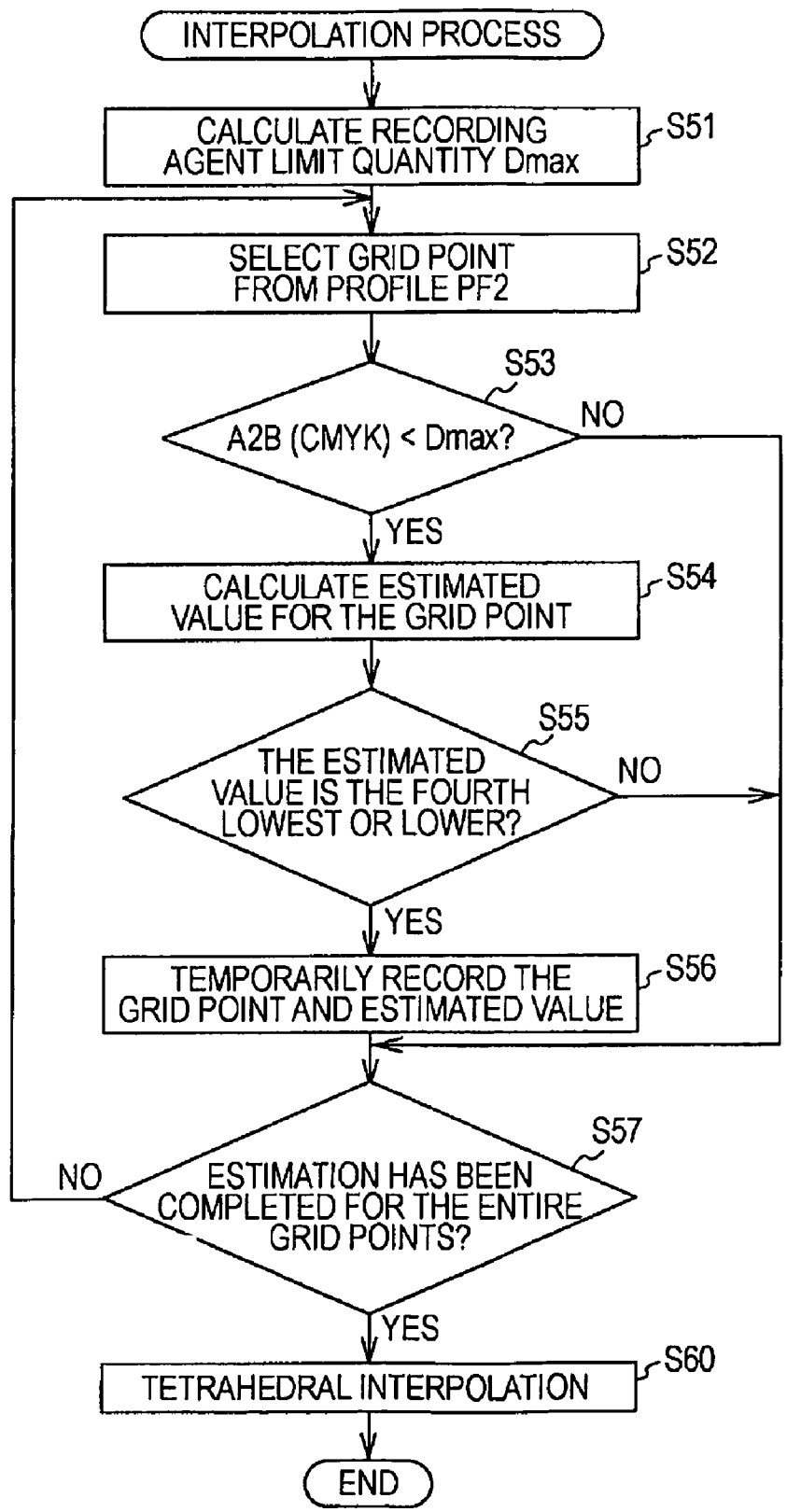
FIG. 15 is a flowchart illustrating an interpolation process.

FIG. 15 is a flowchart of the interpolation process in step S50 of FIG. 5. When the interpolation process starts, the recording agent limit quantity is calculated in step S51. The recording agent limit quantity may be calculated by a method of calculating by referring to a profile, such as the profile PF2, that connects the Lab color space and the $C_2M_2Y_2K_2$ color space, or a method of preliminarily obtaining a recording agent limit quantity based on the adhering characteristics of colorants on the recording medium and using this value as the recording agent limit quantity. In the present embodiment, the former method is used for calculation of the recording agent limit quantity. That is, the sum of tone values of each color at each grid point is calculated by referring to a profile and used as an index representing the recording agent quantity at each grid point, and the maximum of the indices is used as the recording agent limit quantity.

In subsequent steps S52 to S57, among the color values B2 not exceeding the recording agent limit quantity, the four higher grid points located adjacent to a grid point to be processed are retrieved. First, one of the grid points described in the profile PF2 is selected in step S52, and the recording agent quantity of the grid point is compared with the recording agent limit quantity in step S53, thereby determining whether the recording agent quantity of the selected grid point exceeds the recording agent limit quantity. If the recording agent quantity of the selected grid point is smaller than or equal to the recording agent limit quantity, the flow proceeds to steps S54. On the other hand, if the recording agent quantity of the selected grid point is larger than the recording agent limit quantity, it is determined that the grid point is not suitable for the interpolation process, and the flow proceeds to step S57.

In step S54, a difference $\Delta E$ ($=C_3-C_4$) between a standard color value $C_3$, which is calculated by performing tone curve correction on a standard color value $C_1$ corresponding to the color values B1 of the LUT 3, and a standard color value $C_4$, which is obtained by converting the grid point selected as a processing target in step S52 to the Lab values based on the profile PF2, is calculated. This difference $\Delta E$ will be referred to as an estimated value.

In subsequent step S55, a determination is made as to whether the estimated value $\Delta E$ calculated in step S54 is the fourth lowest or lower. The processes of steps S52 to S57 are repeated until the processes of steps S52 to S57 are completed for the entire grid points described in the profile PF2, and the lowest to the fourth lowest estimated values among the estimated values $\Delta E$ of the previously processed grid points are temporarily stored in the RAM 12 as $\Delta Emin1$ to $\Delta Emin4$. Moreover, the coordinates of the grid points corresponding to the estimated values $\Delta E$ are also temporarily stored in the RAM 12 together with the estimated values $\Delta E$. Although since tetrahedral interpolation is performed in the present embodiment, the lowest to the fourth lowest values are stored, in the case of performing the cubic interpolation, the lowest to the sixth lowest values may be stored. Further, in the case of performing other interpolation methods, the estimated values and the grid points may be stored by the number of nearest grid points that are needed, respectively.

When it is determined in step S55 that the estimated value calculated in step S53 is smaller than any of $\Delta Emin1$ to $\Delta Emin4$ temporarily stored in the RAM 12, the flow proceeds to step S56. In step S56, four smallest values of the estimated values including the calculated estimated value $\Delta E$ are registered in the minimum values $\Delta Emin1$ to $\Delta Emin4$. On the other hand, if it is determined in step S55 that the estimated value $\Delta E$ is larger than either one of $\Delta Emin1$ to $\Delta Emin4$, the flow proceeds to step S57.

In step S57, a determination is made as to whether the processes of steps S52 to S57 have been completed for the entire grid points of the profile PF2. When it is determined that the processes have been completed for the entire grid points of the profile PF2, the flow proceeds to step S60. When there is any grid point that is not yet processed, the flow returns to step S52 to perform the processes of steps S52 to S57 on the non-processed grid point.

In step S60, tetrahedral interpolation is performed with $\Delta Emin1$ to $\Delta Emin4$ stored in the RAM 12 being used as the vertices, thereby calculating the CMY values at conversion destination of the LUT. In the present embodiment, since the inside/outside color gamut determination is performed in step S40, basically, the processing target grid points will be included in a rectangular region surrounded by the grid points of the profile PF2. However, depending on an algorithm (for example, three-dimensional convex hull, polygon, and the like) used for formation of the gamut outer shell in step S40, the processing target grid points may fall outside the rectangular region surrounded by the grid points of the profile PF2 even though they are determined in step S40 to fall within the gamut. This step is effective for a case where the interpolation process is performed without performing the above-described inside/outside color gamut determination process or gamut mapping process. In step S60, a determination is made as to whether the processing target grid points fall within the rectangular region surrounded by the grid points.

Figure 16:
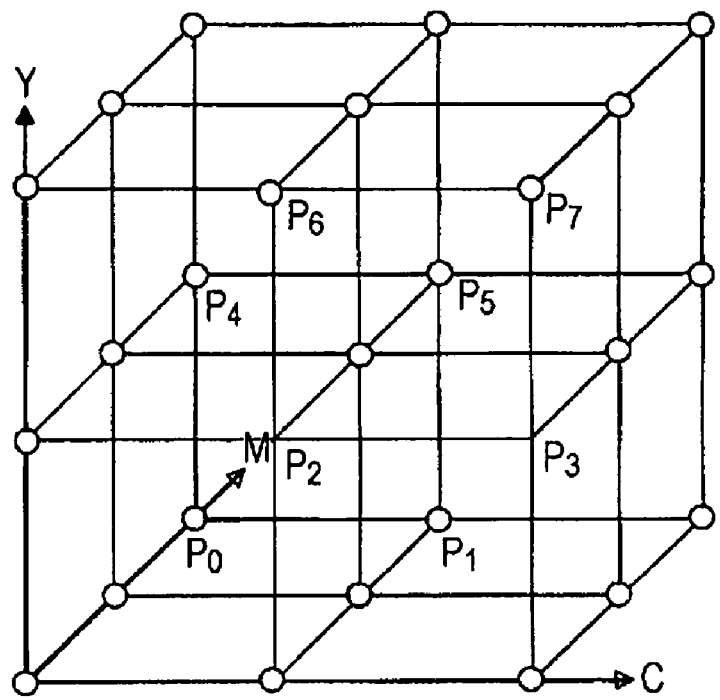
FIG. 16 is a schematic diagram of a grid formed by C, M, and Y (e.g., K=0) of a profile PF2.

FIG. 16 is a schematic diagram of a grid formed by C, M, and Y components (e.g., K=0) of the profile PF2. In FIG. 16, although twenty seven (27) grid points are considered and eight (8) rectangular regions P0 to P7 are illustrated, the numbers of grid points and rectangular regions may vary depending on a profile used. The CMY values at the grid points described in the profile PF2 and the CMY values obtained by converting the standard color values $C_2$ into the $C_2M_2Y_2K_2$ color space are compared with each other in order, and when the input CMY values belong to any of the regions P0 to P7, the input CMY values are interpolated into the CMY values on the corresponding region by tetrahedral interpolation. On the other hand, if the input values do not belong to any of the regions, the input values are interpolated into the nearest CMY values.

Figure 17:
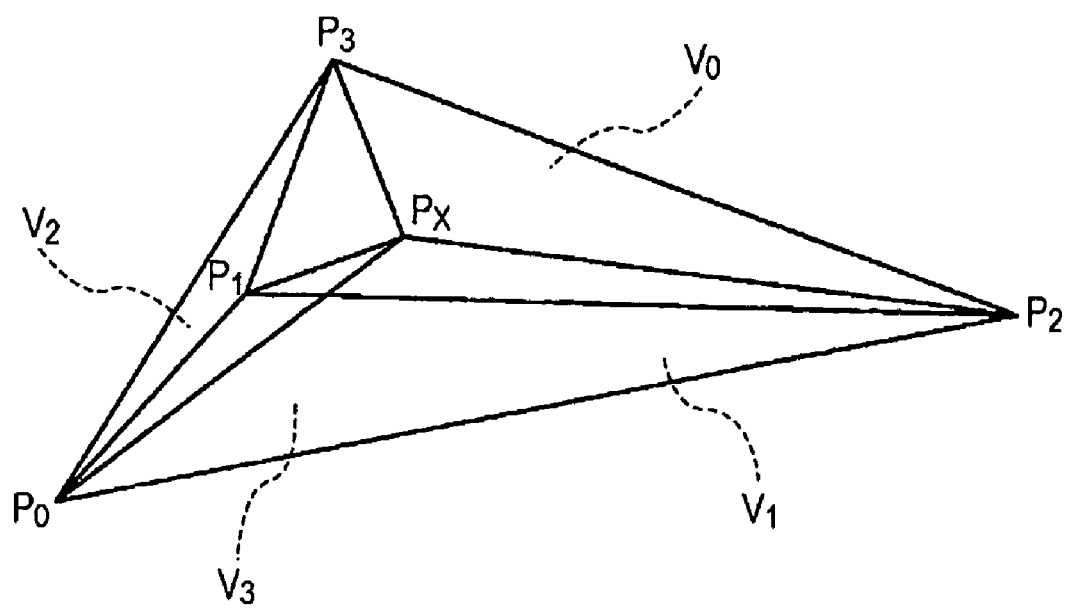
FIG. 17 is a diagram for explaining a tetrahedral interpolation.

FIG. 17 is a diagram for explaining the tetrahedral interpolation according to the present embodiment. The tetrahedral interpolation shown in FIG. 17 is implemented by Formula 4.

Formula 4

$$c' = c_0 \cdot v_0 + c_1 \cdot v_1 + c_2 \cdot v_2 + c_3 \cdot v_3 \\ m' = m_0 \cdot v_0 + m_1 \cdot v_1 + m_2 \cdot v_2 + m_3 \cdot v_3 \\ y' = y_0 \cdot v_0 + y_1 \cdot v_1 + y_2 \cdot v_2 + y_3 \cdot v_3 \quad \quad (4)$$

$$\begin{cases} v_0: \Delta p_1 p_2 p_3 p_x \\ v_1: \Delta p_2 p_3 p_0 p_x \\ v_2: \Delta p_3 p_0 p_1 p_x \\ v_3: \Delta p_0 p_1 p_2 p_x \end{cases}$$

That is, interpolation is performed using a large tetrahedron formed by four minimum values P0 ($c_1, m_1, y_1$) to P3 ($c_3, m_3, y_3$) and volumes v0 to v3 of four small tetrahedrons which are formed inside the large tetrahedron by the four minimum values P0 to P3 and the CMY values Px ($c_x$, $m_x$, $y_x$) of a substitution source. Specifically, the minimum values located at vertices of the large tetrahedron are weighted by the volumes of the small tetrahedrons positioned on opposite faces of the vertices, and the sum of thus obtained values are used as the CMY values of the interpolated grid points Px. In this way, the LUT in which the calculated CMY values and the K value calculated by the black correction are recorded is used as the LUT 15*b*.

By the processes of steps S20 to S60, the LUT 15*b* in which the black correction is considered is created.

(4) Modification of Gamut Mapping Process

Next, a modification of the above-described gamut mapping process will be described. In the modification, selection is made depending on the extent of similarity of the color gamut shape between the color gamut of the printer 40 and the second chromatic color gamut, between the case where the compression algorithms will be switched based on the cusp value similar to the above-described embodiment, and the case where the lightness-maintaining compression algorithm will be applied over the entire lightness range without switching the compression algorithms. The similarity determination uses the positional relationship between the cusp value $L_{cusp}$ of the color gamut of the printer 40 and the cusp value $L_{cusp}'$ of the second chromatic color gamut. That is, if the cusp values of the color gamut of the printer 40 and the second chromatic color gamut are close, the two color gamut shapes are considered as being similar. When mapping the color points in the second chromatic color gamut located outside the color gamut of the printer 40 to fit into the color gamut of the printer 40, the mapping is performed so that the lightness values are maintained substantially constant over the entire lightness range. In this way, by switching the compression algorithms on the basis of the relationship between the cusp value of the color gamut of the printer 40 and the cusp value of the second chromatic color gamut, the tone properties after mapping can be more appropriately maintained.

Figure 18A:
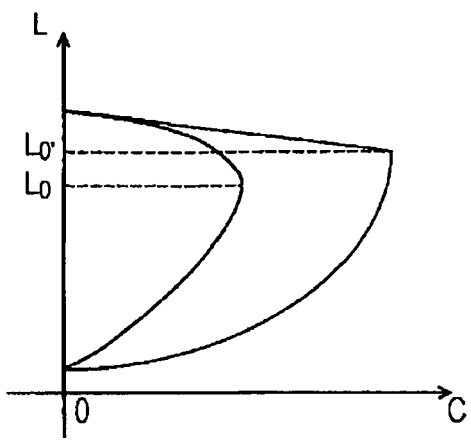
FIGS. 18A to 18C are diagrams showing the states where a color gamut is cut on an ab plane in the Lab space.
Figure 18B:
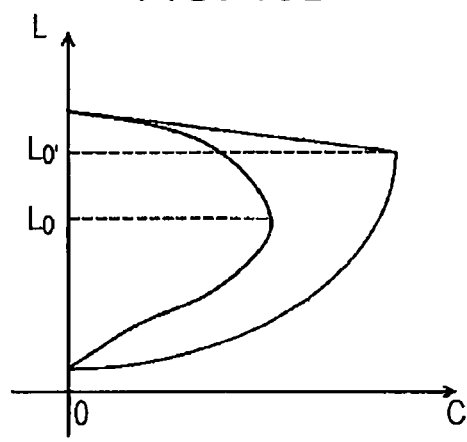
Figure 18C:
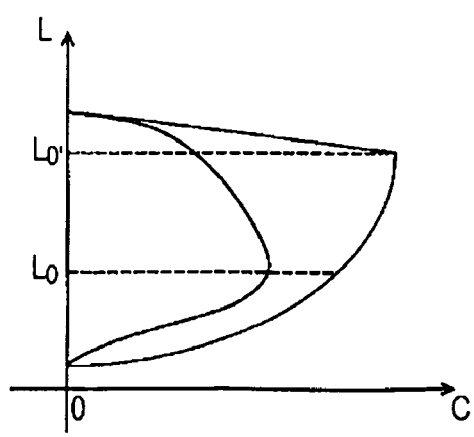

FIGS. 18A to 18C show the states where the color gamut Lab of the display and the color gamut P of the printer are cut on the ab plane in the Lab space. FIG. 18A shows the state where the color gamuts are cut at a hue angle of green, FIG. 18B shows the state where the color gamuts are cut at a hue angle of magenta, and FIG. 18C shows the state where the color gamuts are cut at a hue angle of blue. In the drawings, the horizontal axis represents a chrome C, and the vertical axis represents a lightness L. The cusp value at each hue of the color gamut of the printer 40 has a lightness value at which the cusp value exists, which varies for each of the hue angles. That is, the lightness value for green belongs to a high-lightness side, the lightness value for magenta belongs to an intermediate-lightness side, and the lightness value for blue belongs to a low-lightness side. Therefore, when mapping is performed between color gamuts where the values of the cusp value $L_0$ and the cusp value $L_0'$ are close, the tone properties are sufficiently maintained even when the gamut mapping process is performed using the compression algorithm that maintains the lightness values over the entire lightness range. However, when mapping is performed between color gamuts where the values of the cusp value $L_0$ and the cusp value $L_0'$ are distant from each other, it is preferable to shift the lightness in addition to displacement of chroma from the viewpoint of the color reproduction.

FIG. 19 is a diagram for explaining a method for switching compression algorithms in the gamut mapping process according to the modification. As shown in the drawing, in the gamut mapping process of this modification, the necessity of switching the compression algorithms is first determined by Formula 5 on the basis of the cusp value of each color gamut.

Formula 5

$$\left. \begin{array}{l} J_1 - J_0 > \frac{1}{2}(J_w - J_o): \text{ compression algorithm (with compression)} \\ J_1 - J_0 \leq \frac{1}{2}(J_w - J_o): \text{ compression algorithm (w/o compression)} \end{array} \right\} \quad (5)$$

Here, $L_0$ is a cusp value of the color gamut of the printer 40, $L_1$ is a cusp value of the second chromatic color gamut, and $L_w$ is a white point of the color gamut (or the second chromatic color gamut) of the printer 40. According to Formula 5, a half of a distance between the white point and the cusp value $L_0$ is used as a threshold value $L_{th}$, and a determination is made based on the magnitude relationship between the difference $L_{sub}$ of the cusp values and the threshold value $L_{th}$, as to whether the compression algorithms will be switched. That is, when the difference of the cusp values is larger than the threshold value ($L_{sub} > L_{th}$), it is determined that the color gamut shape of the printer 40 is not similar to the shape of the second chromatic color gamut, and the gamut mapping process is performed similar to the above-described embodiment; that is, the first compression algorithm and the second compression algorithm are switched before and after the cusp value $L_0$. On the other hand, when the difference of the cusp values is smaller than or equal to the threshold value ($L_{sub} \leq L_{th}$), it is determined that the color gamut shape of the printer 40 is similar to the shape of the second chromatic color gamut, and the gamut mapping process is performed using the second compression algorithm that compresses the chroma value while maintaining the lightness over the entire lightness range, for example.

Although in the above-described embodiment, the compression direction of the first compression algorithm is defined in a direction from the processing target color point (C, L) to the cusp value (0, $L_{0p}$) of the color gamut of the printer 40, in this modification, this direction may be changed depending on the difference $L_{th}$ of the cusp values. Specifically, the compression direction may be modified by Formula 6 so that the compression direction is corrected by an angle corresponding to the difference $L_{th}$.

Formula 6

$$\left. \begin{array}{l} \vec{n}_{comp} = \vec{n}_1 + \alpha \vec{n}_2 \\ \vec{n}_1 = (-C \cdot J_0 - J) \\ \vec{n}_2 = (0 \cdot J_0 - J_0') \end{array} \right\} \quad (6)$$

Here, the vector $n_1$ is a vector that extends from the color point (C, L) to the cusp value (0, $L_0$) of the color gamut of the printer 40, the vector $n_2$ is a vector that extends from the cusp value (0, $L_0$) of the color gamut of the display to the cusp value (0, $L_0'$) of the color gamut of the printer 40, and the vector $n_{comp}$ is a vector that represents the compression direction modified by the angle corresponding to the difference $L_{th}$. By Formula 6, the direction of the vector $n_{comp}$ is determined as the sum of the vector $n_1$ and the vector $n_2$ multiplied by a predetermined factor α. By compressing in the direction of the vector $n_{comp}$, the difference of the cusp values can be reflected on the degree of compression of the lightness in the compression. That is, the mapping can be performed so that the degree of compression of the lightness increases as the distance between the cusp values increases while the degree of compression of the lightness decreases as the distance between the cusp values decreases. Similar to the above-described embodiment, in this modification, the lightness compression ratio becomes 0 at the cusp value $L_0$ of the color gamut of the printer 40, and thus, the continuity of the compression direction and the compression ratio at the cusp value $L_0$ is maintained.

Figure 20:
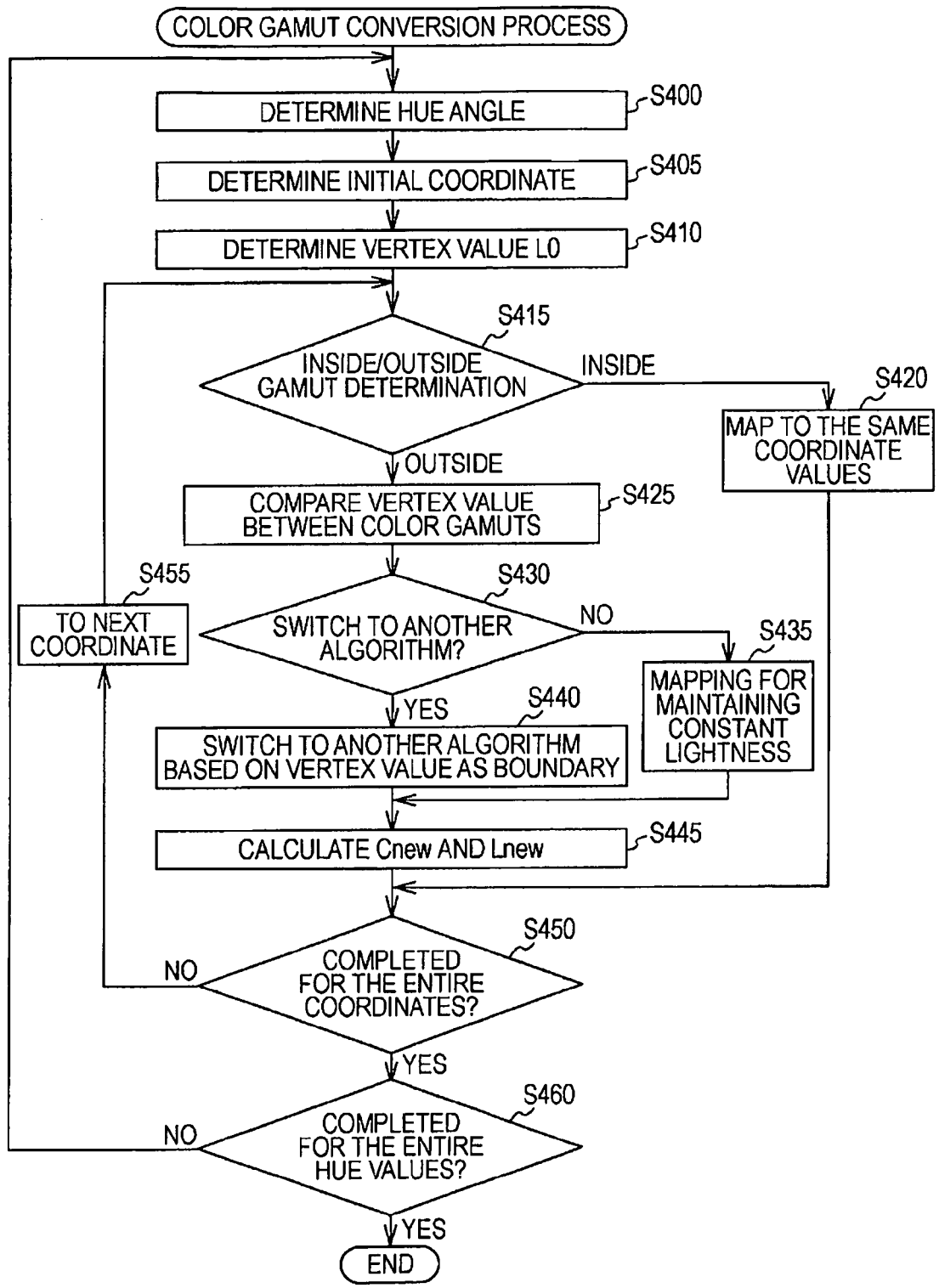
FIG. 20 is a flowchart of the gamut mapping process according to the modification.

FIG. 20 is a flowchart of the procedure of performing the gamut mapping process while selecting the mapping algorithm based on Formula 5. When the process starts, first, a hue angle θ at which the processing target color point exist is determined in step S400, and the initial coordinate (C, L) at the hue angle θ is determined in step S405. Then, the cusp value $L_0$ of the color gamut of the printer 40 at the hue angle θ is acquired in step S410, and an inside/outside determination is made in step S415 as to whether the color points of the initial coordinate fall within the color gamut of the printer 40. When the inside/outside determination result shows that the input color points are within the color gamut of the printer 40, the input color points are mapped in step S420 to color points of the color gamut of the printer 40 having the same coordinate values as the coordinate (C, L). On the other hand, when the input color points are determined to be outside the color gamut of the printer 40, the cusp value $L_0$ of the color gamut of the printer 40 and the cusp value $L_0'$ of the color gamut of the display at the hue angle θ are determined in step S425, and the difference $L_{sub}$ of these cusp values are compared with the threshold value $L_{th}$. When the comparison result shows that the difference $L_{sub}$ is smaller than the threshold value $L_{th}$, it is determined in step S430 that the algorithm is not to be switched and the flow proceeds to step S435 where it is determined that the mapping is to be performed using only the lightness-maintaining algorithm without switching the compression algorithm. On the other hand, when the comparison result shows that the difference $L_{sub}$ is larger than the threshold value $L_{th}$, the flow proceeds to step S440 where it is determined that the mapping is to be performed with the compression algorithm being switched. Then, the mapping is performed according to the determined algorithm. That is, the coordinate ($C_{new}$, $L_{new}$) of a compression destination is determined in step S345 according to the determined compression algorithm, and the input coordinate is mapped to this coordinate.

In this way, when the mapping of the coordinate (C, L) is completed in steps S420 and S445, a determination is made in step S450 as to whether the computations for the coordinate ($C_{new}$, $L_{new}$) are completed for the entire coordinates. When it is determined in step S450 that the computations have not yet been completed for the entire coordinates, a subsequent computation candidate coordinate (C, L) is set in step S455 and processes of step S415 and subsequent steps are repeated. When it is determined in step S450 that the computations have been completed for the entire coordinates, a determination is made in step S460 as to whether the gamut mapping process has been completed for the entire hue values, and the processes of step S400 and the subsequent steps are repeated until it is determined that the gamut mapping process has been completed for the entire hue values.

(5) Summary

In the embodiment of the invention, when creating the LUT 15*b* that defines the color conversion rule from $C_1M_1Y_1K_1$ to $C_2M_2Y_2K_2$, a conversion destination of $k_1=0$ in the LUT1 which is created based on the profiles PF1 and PF2 is corrected to $k_2=0$. When an input value of $k_1 \neq 0$ is converted to a value smaller than the quantization threshold Th, the conversion destination is corrected to be larger than or equal to the quantization threshold. Moreover, a recording agent duty limit of a predetermined print medium is acquired, and the tone values of the $C_2M_2Y_2K_2$ recording agents are corrected so that the recording agent quantities do not exceed the recording agent duty limit. Therefore, it is possible to provide a color conversion method capable of ensuring the color reproducibility of black while reflecting the tone curve adjustment in the previous state.

In addition, this invention is not limited to the embodiments or modifications which were mentioned above. The structure which can be configured by replacing elements or by changing combination of the elements in the embodiments and modifications or the structures which can be configured by replacing elements or by changing combination of the elements in the above described embodiments and modifications and other related arts will be included within the scope of the invention.

The entire disclosure of Japanese Patent Application No. 2008-158423, filed Jun. 17th, 2008 is expressly incorporated by reference herein.

What is claimed is:

1. A color conversion method for converting first color data in a first color space to second color data in a second color space, based on a first profile that defines the correspondence between the first color space that is expressed by a first chromatic color and a first black and a predetermined device-independent color space, a second profile that defines the correspondence between the second color space that is expressed by a second chromatic color and a second black and the device-independent color space, and a color conversion rule in the device-independent color space, the method being formed by a computer comprising:
   a black correction step of converting the first black corresponding to the first color data having a tone value of 0 to the second black corresponding to the second color data having a tone value of 0 so that when the first black corresponding to the first color data having a tone value other than 0 is converted to a value smaller than a quantization threshold of tone values 0 and 1 of the second color data, a conversion destination becomes greater than or equal to the quantization threshold;
   a recording agent limit quantity calculating step of setting an upper limit of the sum of tone values for each pixel of the second color data with respect to a predetermined print medium; and
   a chromatic color correcting step of converting the second chromatic color so that the second color data after conversion in the black correction step does not exceed the upper limit.

2. The color conversion method according to claim 1, wherein in the chromatic color correcting step, the second chromatic color of the conversion destination is calculated by an interpolation calculation on the basis of a combination that does not exceed the upper limit, among combinations of the second chromatic color and the second black defined in the second profile.

3. The color conversion method according to claim 1, wherein in the chromatic color correcting step, the chromatic colors are converted to have nearest hue values before and after the conversion.

4. The color conversion method according to claim 1, further comprising a color gamut conversion step of forming a second chromatic color gamut that represents a color reproducible range producible by the second chromatic color without changing a quantity of black on the basis of the upper limit so that a color point located outside the second chromatic color gamut is converted to a color point located inside the second chromatic color gamut.

5. The color conversion method according to claim 1, wherein when for a predetermined hue in the predetermined device-independent color space, there is an out-of-gamut region which is out of a color gamut of a second chromatic color gamut that represents a color reproducible range expressible by the second chromatic color without changing a quantity of the second black within the range of the upper limit and which is in a color gamut of a second color space formed by the first profile and the color conversion rule, the method further comprises:
   a detecting step of detecting a lightness at a maximum chroma of the color gamut of the second chromatic color gamut in the predetermined hue;
   a color gamut conversion step of compressing a color gamut shape of the second color space based on a color gamut shape of the second chromatic color gamut by performing a color gamut conversion process of mapping to be in the color gamut of the second chromatic color gamut while compressing both chromas and lightnesses on a high-lightness side of the lightness detected in the detecting step, while performing a color gamut conversion process of mapping to be in the color gamut of the second chromatic color gamut while maintaining approximately constant lightnesses on a low-lightness side of the lightness detected in the detecting step and compressing chromas, thereby defining the correspondence between the color gamut of the second color space and the color gamut of the second chromatic color gamut; and
   a color conversion step of converting the first color data to the second color data on the basis of the correspondence.

6. The color conversion method according to claim 5, wherein in the color gamut conversion step, on the high-lightness side of the lightness detected in the detecting step, when a color gamut shape of the second color space is fitted to a color gamut shape of the second chromatic color gamut, a color gamut conversion process of mapping to be in the color gamut of the second color space is performed by gradually decreasing a compression ratio of lightnesses as a lightness to be compressed gets closer to the lightness detected in the detecting step.

7. The color conversion method according to claim 5, wherein in the color gamut conversion step, when a color gamut shape of the second color space is fitted to a color gamut shape of the second chromatic color gamut, a color gamut conversion process is performed while performing the compression so that at the lightness detected in the detecting step, a compression ratio and a compression direction on the high-lightness side of the lightness detected in the detecting step coincide with a compression ratio and a compression direction on the low-lightness side of the lightness detected in the detecting step.

8. The color conversion method according to claim 5, wherein in the color gamut conversion step, when the color gamut shape of the second color space is fitted to the color gamut shape of the second chromatic color gamut on the high-lightness side of the lightness detected in the detecting step, a color gamut conversion process of compressing the color gamut shape toward the lightness detected in the detecting step on a lightness axis of the device-independent color space while mapping into the color gamut of the second color space with a compression ratio corresponding to a distance from an outer shell of the color gamut of the second chromatic color gamut is performed.

9. The color conversion method according to claim 5, wherein in the color gamut conversion step, when the color gamut shape of the second color space is fitted to the color gamut shape of the second chromatic color gamut on the high-lightness side of the lightness detected in the detecting step, a color gamut conversion process of limiting a compression destination of the out-of-gamut region to a predetermined range from the outer shell of the second chromatic color gamut and normalizing the out-of-gamut region and the predetermined range in the compression direction with respect to the predetermined range is performed.

10. An image processing apparatus for converting first color data in a first color space to second color data in a second color space, based on a first profile that defines the correspondence between the first color space that is expressed by a first chromatic color and a first black and a predetermined device-independent color space, a second profile that defines the correspondence between the second color space that is expressed by a second chromatic color and a second black and the device-independent color space, and a color conversion rule in the device-independent color space, the apparatus comprising:
   a black correction unit capable of converting the first black corresponding to the first color data having a tone value of 0 to the second black corresponding to the second color data having a tone value of 0 and converting the first black corresponding to the first color data having a tone value other than 0 to the second black corresponding to the second color data having a tone value other than 0;
   a recording agent limit quantity calculating unit capable of setting an upper limit of the sum of tone values for each pixel of the second color data with respect to a predetermined print medium as a recording agent duty limit; and
   a chromatic color correcting unit capable of converting the second chromatic color so that the second color data after conversion by the black correction unit meets the recording agent duty limit.

11. A non-transitory computer readable medium encoded a color conversion program for converting first color data in a first color space to second color data in a second color space, based on a first profile that defines the correspondence between the first color space that is expressed by a first chromatic color and a first black and a predetermined device-independent color space, a second profile that defines the correspondence between the second color space that is expressed by a second chromatic color and a second black and the device-independent color space, and a color conversion rule in the device-independent color space, the color conversion program causing a computer to implement:
   a black correction function of converting the first black corresponding to the first color data having a tone value of 0 to the second black corresponding to the second color data having a tone value of 0 and converting the first black corresponding to the first color data having a tone value other than 0 to the second black corresponding to the second color data having a tone value other than 0;
   a recording agent limit quantity calculating function of setting an upper limit of the sum of tone values for each pixel of the second color data with respect to a predetermined print medium as a recording agent duty limit; and
   a chromatic color correcting function of converting the second chromatic color so that the second color data after conversion by the black correction function meets the recording agent duty limit.

* * * * *